US010298598B1

(12) United States Patent
McClintock et al.

(10) Patent No.: US 10,298,598 B1
(45) Date of Patent: May 21, 2019

(54) COUNTERING SERVICE ENUMERATION THROUGH IMPOSTER-DRIVEN RESPONSE

(71) Applicant: Amazon Technologies, Inc., Reno, NV (US)

(72) Inventors: Jon Arron McClintock, Seattle, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/108,238

(22) Filed: Dec. 16, 2013

(51) Int. Cl.
*H04L 29/06* (2006.01)

(52) U.S. Cl.
CPC ...... *H04L 63/1416* (2013.01); *H04L 63/1425* (2013.01)

(58) Field of Classification Search
CPC .................. H04L 63/1416; H04L 63/1425
USPC .......................................................... 726/23
See application file for complete search history.

(56) References Cited

U.S. PATENT DOCUMENTS

| 6,088,804 | A * | 7/2000 | Hill | G06F 21/552 726/25 |
|---|---|---|---|---|
| 6,654,882 | B1 * | 11/2003 | Froutan | H04L 63/1416 713/153 |
| 7,958,558 | B1 * | 6/2011 | Leake | G06F 12/1416 726/23 |
| 8,170,020 | B2 * | 5/2012 | Oliver | H04L 63/0227 370/392 |
| 8,171,544 | B2 * | 5/2012 | Black | H04L 45/00 726/22 |
| 9,350,748 | B1 * | 5/2016 | McClintock | H04L 63/1408 |
| 2002/0157021 | A1 * | 10/2002 | Sorkin | H04L 63/0227 726/4 |
| 2003/0028806 | A1 * | 2/2003 | Govindarajan | H04L 63/0254 726/4 |
| 2004/0128529 | A1 * | 7/2004 | Blake | H04L 63/1441 726/25 |
| 2005/0172155 | A1 * | 8/2005 | Sheymov | G06Q 20/10 726/5 |

(Continued)

OTHER PUBLICATIONS

Thorsten Holz, Markus Engelberth, and Felix Freiling. 2009. Learning more about the underground economy: a case-study of keyloggers and dropzones. In Proceedings of the 14th European conference on Research in computer security (ESORICS'09), Michael Backes and Peng Ning (Eds.). Springer-Verlag, Berlin, Heidelberg, 1-18.*

(Continued)

*Primary Examiner* — Matthew T Henning
(74) *Attorney, Agent, or Firm* — Davis Wright Tremaine LLP

(57) ABSTRACT

Techniques for improving computer system security by detecting and responding to attacks on computer systems are described herein. A computer system monitors communications requests from external systems and, as a result of detecting one or more attacks on the computer system, the computer system responds to the attacks by analyzing the behavior of the attacker, relating that behavior to one or more attack profiles and creating a simulated environment to respond to the attack based in part on the attack profiles. The simulated environment responds to the attack by communicating with the attacker.

21 Claims, 12 Drawing Sheets

(56) References Cited

U.S. PATENT DOCUMENTS

| | | | |
|---|---|---|---|
| 2006/0101516 A1* | 5/2006 | Sudaharan | H04L 63/0263 726/23 |
| 2006/0224677 A1* | 10/2006 | Ishikawa | G06Q 10/107 709/206 |
| 2007/0067841 A1* | 3/2007 | Yegneswaran | H04L 63/1491 726/23 |
| 2007/0133537 A1* | 6/2007 | Oliver | H04L 63/0227 370/392 |
| 2008/0046989 A1* | 2/2008 | Wahl | G06F 21/55 726/7 |
| 2008/0141332 A1* | 6/2008 | Treinen | H04L 63/1416 726/1 |
| 2009/0241191 A1* | 9/2009 | Keromytis | H04L 63/145 726/23 |
| 2011/0067107 A1* | 3/2011 | Weeks | G06F 21/55 726/23 |
| 2011/0126289 A1* | 5/2011 | Yue | G06F 21/554 726/26 |
| 2012/0167208 A1* | 6/2012 | Buford | H04L 63/1491 726/22 |
| 2013/0160079 A1* | 6/2013 | Hebert | H04L 63/1491 726/3 |
| 2013/0312099 A1* | 11/2013 | Edwards | G06F 21/554 726/24 |
| 2014/0096229 A1* | 4/2014 | Burns | H04L 63/1491 726/15 |

OTHER PUBLICATIONS

Gerard Wagener, Radu State. Alexandre Dulaunoy, and Thomas Engel. Self adaptive high interaction honeypots driven by game theory. In SSS '09: Proceedings of the 11th International Symposium on Stabilization, Safety, and Security of Distributed Systems, pp. 741-755, Berlin, Heidlberg, 2009, Springer-Verlag.*

Gérard Wagener, Radu State, Alexandre Dulaunoy, and Thomas Engel. 2009. Self Adaptive High Interaction Honeypots Driven by Game Theory. In Proceedings of the 11th International Symposium on Stabilization, Safety, and Security of Distributed Systems (SSS '09), Rachid Guerraoui and Franck Petit (Eds.). Springer-Verl.*

U.S. Appl. No. 14/108,222, filed Dec. 16, 2013, McClintock et al.

* cited by examiner

US 10,298,598 B1

COUNTERING SERVICE ENUMERATION THROUGH IMPOSTER-DRIVEN RESPONSE

BACKGROUND

Computer system security involves constantly evolving threats and ways of protecting against those threats. Malicious individuals, for example, often utilize clever schemes implemented over computer networks for causing people to provide security credentials, transfer money and take other actions adverse to their self-interests. As another example, modern computer systems are frequently subjected to a variety of attacks by malicious agents who attempt to exploit vulnerabilities in the computer system to alter and/or gain control of the computer system. Such attacks, if successful, can lead to significant disruption of computer system operations, possibly leading to system slowdowns and outages as the various services on a host (or server) computer system become corrupted and/or unavailable.

One method of initiating an attack on a host computer system is for an attacker to gain information about the services running on a host computer system and/or about the users of the computer system so that the subsequent attacks can be targeted to those services and/or those users. An attacker will attempt to determine which services are associated with a host by attempting multiple or exhaustive connections to the ports on the host, recording which ports respond and recording how they respond. The attacker may attempt to determine which users are associated with a host by attempting multiple user connections using, for example, common or predictable user names. The attacker may then focus subsequent attacks on the verified services and/or users associated with a host computer system and on locating new vulnerabilities in other services found during the initial probe. Enumerating the services on a host system thus allows an attacker to limit the scope of the attacks to potentially fruitful targets, thereby saving time, expense and effort in the attack and consequentially increasing the vulnerability of the computer system to other attacks.

BRIEF DESCRIPTION OF THE DRAWINGS

Various embodiments in accordance with the present disclosure will be described with reference to the drawings, in which.

DETAILED DESCRIPTION

Figure 1:
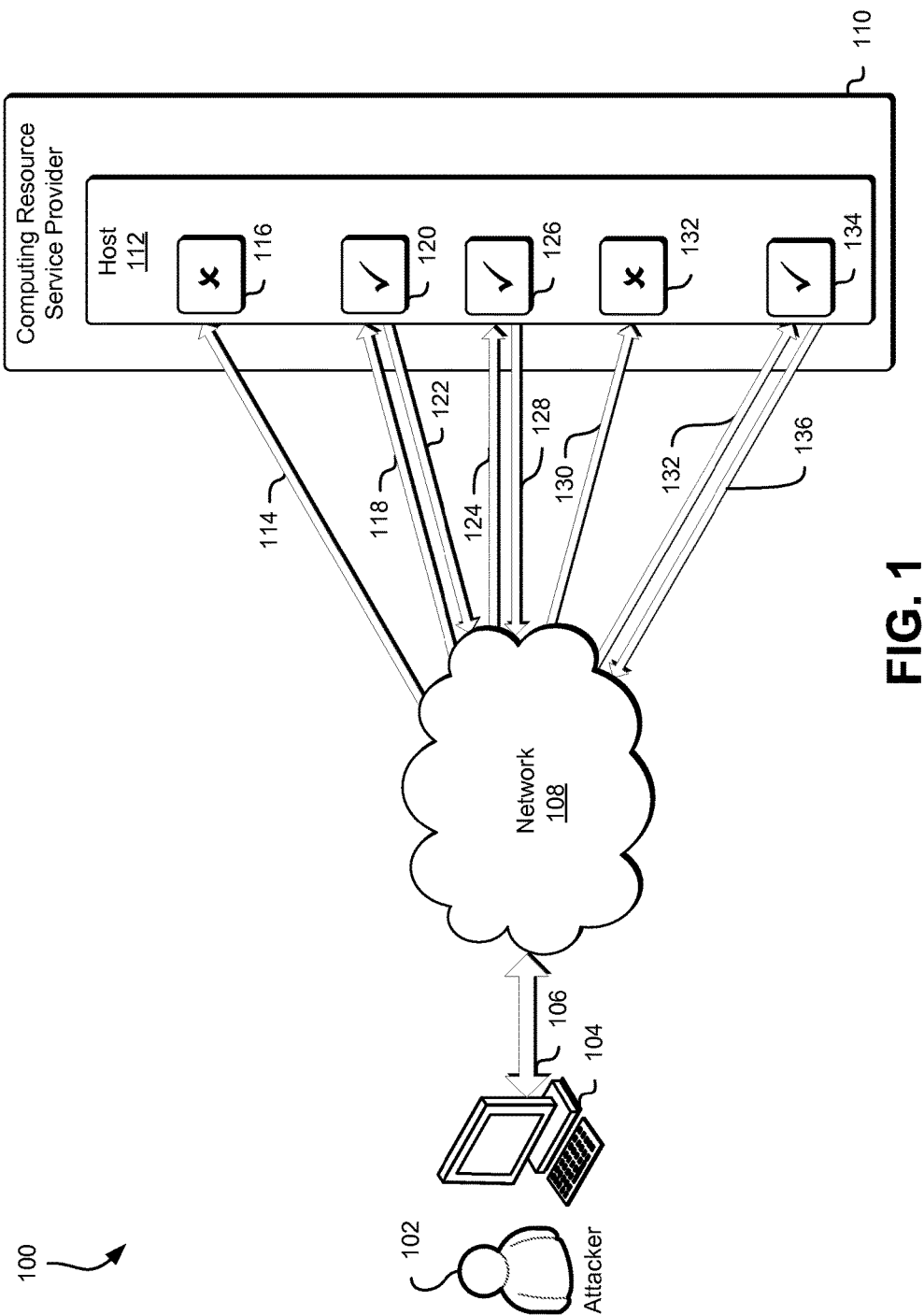
FIG. 1 illustrates an example environment where attacks on computer systems may be detected and managed in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for handling attacks on computer systems and executable code operating thereon. In particular, techniques are disclosed for utilizing computer system processor capabilities to identify potential attacks and for preventing those attacks on operational elements of computer systems, including, but not limited to, host computer systems, services running on host computer systems, guest computer systems, computer system applications, computer system processes, computer system controlling domains and/or other such operational elements. Techniques disclosed described and suggested herein include, but are not limited to, techniques for computer systems where one or more computer system operational elements are running on one or more computer systems as part of a distributed, virtualized and/or datacenter environment (i.e., a distributed and/or virtualized computer system hosted in one or more datacenter facilities, also referred to simply as "a datacenter", "a datacenter computer environment or "a computer system").

A host (or server) computer system, which may be one of a plurality of host (or server) computer systems running within a computer system environment may have one or more services, processes and/or applications running on the system and may also have one or more users of the system. Each of the services, processes and/or applications (referred to simply as "services") may have one or more ports that it may use to, for example, connect to other computer system services via a computer system network. Each of the users of the system may have a user name, authorization credentials, authentication credentials, files, associated policies, permissions and/or other such user profile information. A user may have access to a plurality of host computer systems within a computer system environment that may use the same and/or similar user profile information to provide access.

A computer system network may, for example, be a local network, an internal network, a public network such as the Internet, a wide-area network, a wireless network, a mobile network, a satellite network, a cellular network, a distributed computing system with a plurality of network nodes and/or other such networks. A computer system port is a network communications endpoint under the control of a host computer system operating system. A port may be associated with an internet protocol (IP) address such as an IPv4 or IPv6 address, a port number assigned by the host operating systems, a port type also assigned by the host operating system and/or other such computer system associations. Ports may be used in modern computer systems to allow multiple services to share a single connection to a network by allowing those services to be uniquely associated with certain ports, thereby forwarding all port-addressed network connections to the uniquely associated services. Common port types include, but are not limited to, user datagram protocol (UDP) ports and transmission control protocol (TCP) ports (also referred to as transmission control protocol/internet protocol (TCP/IP) ports). A port may be used by a host computer system to receive connections, or to receive data, or to initiate connections, or to wait for processes in other systems to complete, or to receive and process commands or for a combination of these and/or other such computer system functionality. Certain ports of a host computer system may be well known to allow remote computer systems to access certain well known services on a host computer system. For example, a host computer system may receive connections on TCP port 80 for hypertext transfer protocol (HTTP) connections allowing the host computer system to deliver webpage content to remote systems. A host computer system may also allow connections to TCP port 25 for simple mail transfer protocol (SMTP) connections allowing the host computer system to receive email traffic from remote systems. A host computer system may also allow connections on a variety of other ports for other such computer services and as may be contemplated, these port numbers and port types are merely illustrative examples. Other computer systems that use other ports and/or other port types for other purposes may be considered as within the scope of the present disclosure.

Just as computer systems may have a number of well-known and/or determinable ports and services, a computer system may also have a number of well-known and/or determinable user names. For example, many systems may have users named "root" or "Administrator" or some variant. Many systems also may impose a common naming policy for user names, so that a user named, for example, "John Doe" might have a username such as "jdoe", "johndoe", "john.doe", "doej" or some other such variant.

A host computer system with one or more computer services and one or more ports associated with those services may be vulnerable to attack by a malicious agent, attacker or hacker. As used in the present disclosure, the term "attacker" may be used to refer to single computer system users, computer systems, sets of computer users, sets of computer systems, computer system processes, computer system programs, computer system accounts, computer system profiles, computer system services and/or combinations of these and/or other such attacker elements, the term "attacker computer system" may be used to refer to one or more computer systems used by attackers and the term "computer implemented attack" may be used to refer to one or more attacks initiated by an attacker using an attacker computer system. Multiple attackers may collaborate together in a single attack or may attack a system by initiating multiple attacks. Multiple attackers may be collectively referred to herein as an "attacker."

Before launching an attack, an attacker may first seek to gain information about the system in order to limit the amount of time spent in the attack by, for example, concentrating attacks on certain well known services or ports. An attacker may gain information about a host computer system in a computer system environment by sending communications requests to all of the ports on a host computer system by, for example, trying the ports one-by-one, randomly or in some other order. An attacker may also attempt to gain information about a collection of host computer systems in a datacenter by sending communications requests to all of the ports on all of the host computer systems in a datacenter by, for example, trying the ports one-by-one for each of a range of known and/or determined host computer system IP addresses. In such malicious interaction with a computer system for information gathering, an attacker may cull any port where a communications request does not yield any response from the list of possible attack points. The attacker may then launch subsequent attacks to those ports that do respond to a communications request to attempt to, for example, identify the service operating on that port, identify potential vulnerabilities of the service operating on that port and/or other such focused attacks. By first identifying potentially fruitful attack points, an attacker may reduce the number of attack points of a host system from the thousands of available ports to a small number and may thus attack more efficiently and quickly. An attacker may similarly focus email-based attacks such as, for example, information gathering attacks ("phishing") by first verifying user names on a computer system. A list of valid email addresses on a system may be determined by sending email probes with fairly innocuous information to a number of known, guessed, predicted and/or other such addresses and then using those that do not bounce back as a basis for an email-based attack.

Techniques disclosed and described herein include techniques to identify such attacks, techniques to reduce the efficiency of such attacks and techniques to mitigate and/or prevent such attacks. For a port scanning based attack, a host computer system may first detect that such an attack is occurring. In some embodiments, a host computer system may monitor communication attempts with the host and may log or record any suspicious behavior by a remote computer system. For example, a host computer system may detect that a remote computer system that first scans port 1, and then port 2, and then port 3 and so on, may be acting suspiciously. Similarly, a host computer system may detect that a remote computer system that initiates connections with a certain subset of known ports, but only remains connected to those ports for a very short time may also be acting suspiciously. A host computer may also detect that a remote computer system that sends communications requests to more than a system determined threshold number of unused ports may also be acting suspiciously. As may be contemplated, these types of suspicious behavior triggers are merely illustrative examples and other such types of suspicious behavior triggers may be considered as within the scope of the present disclosure.

In some embodiments, a host computer system may detect that an attack is occurring after a certain system-determined amount of suspicious behavior is attempted by a remote computer system. The host computer system may operate in accordance with some behaviors being less suspicious than other behaviors and may, in some embodiments, maintain a system policy subsystem that uses tracked behaviors to evaluate the potential risk of attack from a remote computer system. A host computer system may use a variety of techniques to detect that an attack is occurring. For example, a host computer system may apply a weighting value to certain behaviors such that a single highly-weighted behavior may cause the host computer system to detect that an attack is occurring while multiple less highly-weighted behaviors may be needed to make the same determination. In some embodiments where the attack manifests as, for example, an email attack, a host computer system, which may be configured to monitor email communications, may detect that an attack is in progress with a small threshold number of suspicious emails and may, in some embodiments, detect that an attack is in progress after having received a single suspicious email. In some embodiments, the determination of an in-progress attack may be made by a program, service, module and/or application running on the host computer system such as, for example, by a security service that is configured to monitor computer systems and send an alarm when an attack is detected. In some embodiments, the determination of an in-progress attack may be made by a program, service, module and/or application running on another computer system running within the computer system environment, such as, for example, a remote attack monitor process such as the one described above. In some embodiments, the determination of an in-progress attack may be made by a combination of programs, services, modules and/or applications running on a plurality of computer systems running within the computer system environment.

Once an attack is detected, a host computer system may then attempt to identify the attacker. The attacker may be identified by, for example, the IP address of the remote machine that originates the communications requests to the host computer system. In some embodiments, the attacker may originate attacks from a plurality of attacking machines such as, for example, from a plurality of attacking machines running in a distributed and/or virtualized computer system environment. In such embodiments, the attacker may be identified by a set of IP addresses or by one or more IP addresses of routers, bridges, switches and/or other such network devices. In some embodiments, the attacker may also be identified by one or more media access control (MAC) addresses of the attacking machines and/or by one or more MAC addresses of other network devices. When the attack is, for example, an email attack, the attacker may be identified in other ways, or may also be identified by one or more sending email addresses. Other identifiers, such as instant messaging system usernames, social media account identifiers and others may be used and the identifier(s) that is/are used may vary according to the systems used to attack.

A host computer system may, in some embodiments, maintain a list of identified attackers by the identifying characteristic and may begin foiling the attacks by, first of all, providing an overwhelming set of false positive results to the attacker. In some embodiments, a host computer system may maintain the list of identified attackers and/or a list of identified attacks by maintaining a table relating attackers to one or more identifying characteristics of the attackers, such as, for example, an IP address of an attacker, or authentication credentials of an attacker or some other such identifying characteristic. In some embodiments, a plurality of host computer systems may maintain one or more shared tables relating one or more identifying characteristics of the attackers, thereby sharing lists of identified attackers between the plurality of hosts. As mentioned herein previously, one of the advantages that an attacker may gain in performing information gathering techniques such as port scans is to attack more efficiently by focusing the attack on fruitful targets. In some embodiments, this advantage may be removed by making the attacker believe (i.e., by presenting to the attacker information that indicates) that a number of the ports (e.g., a majority) on a host computer system, including ports otherwise not in use (e.g., not in use except in response to an attack), are fruitful targets. The host computer may provide the attacker with an overwhelming number of targets by accepting connections on ports that may generally not accept connection. Each connection to a generally unused port may respond to the connection request, thereby presenting to the attacker that there is a service associated with that port by, for example, returning a false service header and one or more false service responses. The host computer may provide these false positive connections by altering the behavior of the host operating system and, rather than not responding to requests on unused ports, may instead respond to requests on unused ports. In some embodiments, the behavior of the host system may be altered by changing one or more operating system behaviors. The behavior of the host system may be altered by instantiating one or more services configured to at least provide responses to the attacking system and connecting those one or more services to one or more of the unused ports. The behavior of the host system may also be altered by instantiating one or more services on one or more other computer systems and redirecting communications originated by the identified attacker to the one or more other services.

The behavior of the host system may also be altered by altering and/or changing the behavior of one or more communications channels (for example ports, or email addresses or other such communication channels) on the host computer system for an attacker computer system. For example, a host computer system may have a set of communications channels that are open (or available) to remote connections and may have a second set of communications channels that are closed (or unavailable) to remove connections. Upon detecting malicious behavior by an attacker computer system, the host system may close some of those communications channels and/or open other communications channels to present the attacker computer system with a varied set of open and/or closed communications channels. In some embodiments, the host computer system may close some communications channels that may be typically open and/or open a large number of communications channels that are typically closed, thereby changing the composition of the set of open communications channels and/or the set of closed communications channels. In some embodiments, the changes may increase the number of communications channels that are open and/or closed, or may decrease the number of communications channels that are open and/or closed or may leave the numbers unchanged, but change the members of the sets of open and/or closed communications channels. The host computer system may, in some embodiments, vary composition of the set of communications channels that are opened and/or of the set communications channels that are closed over the course of an attack, thereby presenting the attacker with varying sets of open and/or closed communications channels. In some embodiments, the communications channels that are altered may only be altered for the attacker computer system, so that non-attacker computer systems may function with unaltered behavior.

In embodiments where one or more services on and/or associated with a host computer system are configured to provide false responses to the communications attempts by an identified attacker to unused ports, such services may also be configured to provide false responses to the communications attempts by the identified attacker to known and/or in-use ports. For example, a host computer system may be running an HTTP server and listening for connections on TCP port 80. A host computer system with altered behavior that is configured to respond to communications attempts from an identified attacker on unused ports may also be configured to respond to connection attempts by an identified attacker on TCP port 80 (the port generally used for HTTP connections) and may be configured to, for example, deliver fake HTTP content over that port. A host computer system may also misidentify a service on a known and/or in-use port by, for example, substituting a different service response on the known and/or in-use port. In some embodiments, the host computer system may substitute a different known service on the known and/or in-use port, thereby confusing the attack and/or the attacker. In some embodiments, the host computer system may substitute a fake service response on the known port, also thereby confusing the attack and/or the attacker. In some embodiments, a host computer system may provide fake responses that are specific to an attacker or to a type of attacker. For example, in some embodiments, a host computer system may provide a fake response on an unused port to a known attacker while still not providing any response to other non-attacker users on that same port. In some embodiments, a host computer may provide one type of fake response to one type of attacker, and another type of fake response to another type of attacker. In some embodiments, upon detecting an attack, the host computer may provide a fake response on an unused port for all connections. In such embodiments, an attack may trigger substituting a fake response for the attacker on an unused port, but that same fake response may also be issued for subsequent connections to that unused port from other attacker and/or non-attacker connections.

In some embodiments, the host computer system may respond with false and/or confusing responses to the attack in such a matter that may be hidden from and/or undetected by the attacker, thereby causing the attacker to continue to operate as if the attack had not been detected. This transparent attack response, or transparent redirection method, may be used to keep the attacker connected and attacking the host computer system with the altered behavior as described herein, thereby delaying the attacker, causing the attacker to expend resources, giving the host computer system time to notify the authorities and/or other such attack responses. For example, by using a transparent redirection method to present the attacker with false responses on known ports, the attacker may be led to believe that the host computer system is operating in an unaltered state. By using a transparent redirection method to present the attacker with false and/or delayed responses on ports that are typically closed, the attacker may be led to believe that the attack is succeeding against a vulnerable system.

An email attack may respond to emails from an identified attacker by taking one or more similar obfuscating actions that give an attacker an overwhelming number of false positive responses. For example, an email attack may rely on sending a number of innocuous emails and determining valid addresses for further targeting by maintaining a list of those emails that bounce back to the sender as undeliverable. A host computer system, upon detecting an email attack may, rather than bouncing undeliverable emails, simply accept all email messages from the attacker, thereby leading the attacker to believe that all of the email addresses are valid. In another example, an email attack may rely on responses from a few unsuspecting users in order to target those users for more in-depth and potentially dangerous attacks. A host computer system, upon detecting such an attack from an attacker, may instead send responses from some or all of the unused email addresses and may also send responses from some or all of the valid email addresses, thereby giving the attacker an overwhelming number of potential targets and thus reducing the efficiency of the attack. In yet another example, an email attack may be configured to be notified when recipients open and/or receive the email. In the event of such an attack associated with a notification system, a host computer may simulate the opening of the sent emails, so that fake notifications may be sent to the attacker, again giving the attacker an overwhelming number of fake potential targets. As may be contemplated, the types of attacks listed herein and the types of potential responses to provide the attacker with an overwhelming number of potential targets are merely illustrative examples and other attack types as well as other associated responses may be considered as within the scope of the present disclosure.

In addition to providing an attacker with an overwhelming number of false positive responses, the host computer system and/or one or more other services may engage in a number of other behaviors to respond to the attack. For example, a host computer system may accept connections long enough to identify the attacker and then, for each subsequent communication attempt from the attacker, the host computer system may immediately terminate any connection from the attacker on any port. A host computer system may also do the opposite and keep the connection from the attacker open as long as possible, thereby further reducing the efficiency of the attack. In some embodiments where the connection is kept open, the host computer system may seek to further delay the attacker by, for example, sending false responses, delaying any communications by inducing long timeouts between data packets, feeding very small amounts of information contained in a large number of packets, sending redundant packets, consuming large amounts of the attacking computer system bandwidth by sending very large packets of useless data and/or other such delaying tactics. A host computer system may, while delaying the attacker with bogus information, send an alarm (e.g., one or more notification message over one or more communication channels) to a computer system operator and/or another computer system, thereby allowing engagement of other security response processes including, but not limited to, notifying authorities and/or the internet service provider (ISP) of the attack.

In some embodiments, the host computer system may be attacked by an attacker seeking authorization and/or authentication credentials to access the host computer system. In such embodiments, the attacker may use email and/or other communications attempts to trick a host computer system user (e.g., user of a service provided using, at least in part, the host computer system) into providing such credentials. In response to such an attack, a host computer system may provide the attacker with fake credentials that may be used to access a fake user account or fake credentials to access a limited and/or restricted account on the host computer system. The host computer system may then allow the attacker to access the fake user account and may, for example, record the actions of the attacker while the attacker is connected to the fake account.

In some embodiments, the host computer system may respond to an attack by engaging in a combination of the delaying and frustrating attacks mentioned herein. For example, when a host computer system is configured to provide false or bogus service responses to communications attempts on unused and/or in-use ports, the host computer system may also be configured to both engage in the delaying tactics mentioned herein and to also engage other security processes. As a result of such a combined approach, an attacker may not only receive bogus service responses very slowly, but may also remain connected to the host computer system waiting for the bogus responses while authorities are notified.

As was mentioned previously herein, in some embodiments, the host computer system may operate one or more other services to help identify and/or foil attacks from an identified attacker and the computer system may redirect all communications attempts from the attacker to the one or more other services. In some embodiments, the computer system environment may instantiate an imposter service that may be configured to receive connection attempts from the attacker and, in addition to performing one or more of the delaying tactics mentioned herein above, may also be configured to begin remedial action by, for example, seeking out additional information about the attacker. The host computer system may initially determine the address of the attacker as mentioned herein, but the imposter service may seek to gather information about the person behind the attack such as, for example, by displaying false login screens, or by requesting other identifying information in other ways. The imposter system may also seek to determine what kind of computer an attacker is using, what operating system, what web browser, where the attacker is located, the internet service provider (ISP) of the attacker, and/or other such pieces of identifying information.

In some embodiments, the imposter may attempt to engage in a scripted interaction with the attacker, using automation techniques. Such an attack response simulation may be provided to an attacker in a manner that the attacker may be unlikely to detect (a transparent redirection method) in an effort to convince the attacker that the attack is succeeding when it is not, thus keeping that attacker connected in an effort to gather information about the attacker and/or the attack. An imposter may also provide a plurality of attack response simulations (also referred to simply as "simulations") to an attacker, altering how the imposter responds to the attack as the attack changes. In some embodiments, where a plurality of attackers may attack a system in a coordinated attack, an imposter may determine one or more shared simulations that may be provided to the attackers, so that they all receive the same view of the system during the attack. In an embodiment where the attack is an email attack, the imposter may, for example, begin a suitably scripted email exchange with the attacker, giving false information while simultaneously seeking information about the attacker. In the same attack where a plurality of attackers may be cooperating, the imposter may alter the scripted email exchange with one attacker based on responses sent to other attackers. Suitably delayed responses over email may keep the attacker or attackers connected to the host computer system for extended periods of time again allowing more information gathering as well as time to engage other security processes.

A host computer system and/or one or more other services on one or more other computer systems may instantiate additional services to aid in the identification and/or foiling of attacks on the host computer system. In some embodiments, in addition to the imposter mentioned herein, a host computer system may instantiate an attack analyzer learning system that may be configured to assist the imposter in generating false responses by analyzing attack patterns and determining best practice responses. For example, an attack analyzer learning system may determine that an attack uses a certain identified piece of software and that software is configured to always attack services in a certain order. In such an example, the attack analyzer may be able to predict the next service attacked and may be able to alert the imposter accordingly. Similarly, an attack analyzer, through pattern analysis, may be configured to recognize certain actions as precursors to potential attacks earlier, and may thus be able to begin identification and mitigation sooner. In another example, an attack analyzer may recognize techniques common to a certain attacker and despite a new and/or different IP address or other identifier, may be able to determine that the attack is originating from a previously known attacker. In some embodiments, an attack analyzer may also be configured to adapt patterns, so that when behavior of an attacker begins to diverge from previously known patterns, the attack analyzer may create a new pattern responding to the new attack approach. As may be contemplated, the methods that an attack analyzer may recognize, respond to and update attack patterns described herein are merely illustrative examples and other types of attack pattern recognition, responses and adaptations may be considered as within the scope of the present disclosure.

FIG. 1 illustrates an example environment 100 where attacks on host and/or server computer systems within a computer system environment may be detected and managed as well as the associated code running thereon, in accordance with at least one embodiment. An attacker 102 may connect to a computer system through a computer system client device 104 and may initiate an attack on one or more host computer systems 112 running within a computing resource service provider 110 such as a distributed, virtualized and/or datacenter environment. In some embodiments, the attacker 102 may be a person, or may be a process running on one or more remote computer systems, or may be some other computer system entity, user or process. The command or commands to connect to the computer system may originate from an outside computer system and/or server, or may originate from an entity, user or process on a remote network location, or may originate from an entity, user or process within the computer system, or may originate from a user of the computer system client device 104, or may originate as a result of a combination of these and/or other such entities. The command or commands to initiate an attack may originate from the same origin as the command or commands to connect to the computer system or may originate from a different outside computer system and/or server, or may originate from a different entity, user or process on the same or a different remote network location, or may originate from a different entity, user or process within the computer system, or may originate from a different user of a computer system client device 104, or may originate as a result of a combination of these and/or other such same and/or different entities.

The attacker 102 may request connection to one or more host computer systems 112 via one or more connections 106 and, in some embodiments, via one or more networks 108 and/or entities associated therewith, such as servers connected to the network, either directly or indirectly. The computer system client device 104 that may request access to the host computer system may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

The computing resource service provider 110 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 110 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines may be physical machines located within the computer system environment. In some embodiments, the host machines may be guest virtual machines operating on physical machines located within the computer system environment.

The attacker 102 may initiate an attack against the host computer system 112 by first attempting a connection 114 to one or more services, ports, users, processes and/or other such entities 116 running on and/or associated with the host computer system 112. In some embodiments, the entity 116 may be one or more unused ports that may not be associated with a service running on and/or associated with the host computer system 112 as described herein. In such embodiments, the attempted connection 114 may be an attempted port connection such as, for example, an attempted connection such as may be associated with a port-scan attack. In some embodiments, the entity 116 may be one or more email addresses of one or more users of the host computer system 112. In such embodiments, the attempted connection 114 may be an attempted email connection such as may be associated with, for example, an email phishing attack as described herein. The host computer system 112 may not, at the time of the attack, be aware that the attack is occurring and so may not be configured to respond to the attempted connection 114. The host computer system 112 may also have a default response, such as, for example, redirecting the connection to another port, sending an error response, sending an error email, bouncing the false email connection and/or other responses. In some embodiments, the host computer system may record the attempted connection and may also record one or more identifying features of the attacker and/or the attempted connection 114.

The attacker 102 may initiate further attacks against the host computer system by attempting a connection 118 to one or more services, ports, users, processes and/or other such entities 120 running on and/or associated with the host computer system 112. In some embodiments, the entity 120 may be one or more in-use ports that may be associated with a service running on or associated with the host computer system 112 as described herein. As described herein, the attempted connection 118 may be a port connection, or an email connection or some other such connection to the host computer system. As with attempted connection 114, the host computer system may not, at the time of the attack, be aware that the attack is occurring and so may respond to the attack as if the attempted connection 118 were a legitimate connection attempt, allowing connection to the port, delivering the email and/or other such legitimate connection responses.

As a result of logging attack attempts, the host computer system 112 may determine that the attacker 102, the associated computer system client device 104 and/or the associated connection 106 are associated with one or more malicious acts and may begin to respond accordingly. The host computer system 112 may detect that an attack is in progress when, for example, the number of suspicious acts of the attacker 102 reaches and/or exceeds a threshold value. In some embodiments, the host computer system may record and prioritize all suspicious activity by any entity that attempts connections with the host computer system and as a result of such recording and weighting, identify attackers and attacks. In some embodiments, the host computer system and/or one or more other entities associated with the host computer system may employ expert systems, learning systems, tracking systems, pattern matching systems, state machine systems and/or other such modeling, simulation or prediction systems to at least partially detect whether an attack is in progress. In some embodiments, the host computer system and/or the one or more other associated entities may also apply such modeling, simulation or prediction systems to at least partially determine responses to such attacks. A host computer system may, in some embodiments, employ other associated systems and resources to facilitate delivering the responses to such attacks including, for example, automated imposters, artificial ports, artificial users, automated email responders and/or other such systems and resources.

The attacker 102 may initiate further attacks against the host computer system when the host computer system is aware of the attack by attempting a connection 124 to one or more services, ports, users, processes and/or other such entities 126 running on and/or associated with the host computer system 112. In some embodiments, the entity 126 may be one or more unused ports that may not be associated with a service running on and/or associated with the host computer system 112 as described herein. As with attempted connection 114, the attempted connection may be an attempted port connection on one or more unused ports, or may be an attempted email connection to one or more unused email addresses. In embodiments where the host computer system is aware of occurring attack, the host computer system may be configured to provide a fake, artificial or imposter response 128 using one or more of the modeling, simulation, predictive, imposter and/or other such associated services as described herein. The fake response may serve to delay and/or foil the attack, may serve to provide false information to the attacker such as, for example, the implied existence of one or more non-existent services or users, may serve to solicit information from the attacker such as information related to the identity or location of the attacker and/or may serve other such attack management purposes.

In some embodiments where the host computer system is aware of an attack, the host computer system may be configured to use the one or more modeling, simulation, predictive, imposter and/or other such associated services to provide other types of responses. For example, an attacker 102 may attempt a connection 130 to an entity such as a port or an email address that may be valid and usable. If the host computer is aware of an attack and/or aware of the attacker, the host computer system may elect not respond to the connection attempt to the valid port or email address and may instead use the imposter to provide false information to the attacker and/or to otherwise foil the attack as described herein. The host computer system may also accept connection 132 to computer system entities 134 that are valid and usable as in connection 130, but rather than not responding, the host computer system may provide a fake, artificial or imposter response 136 like the fake, artificial or imposter response 128. Again, the fake, artificial or imposter response may serve to delay and/or foil the attack.

Figure 2:
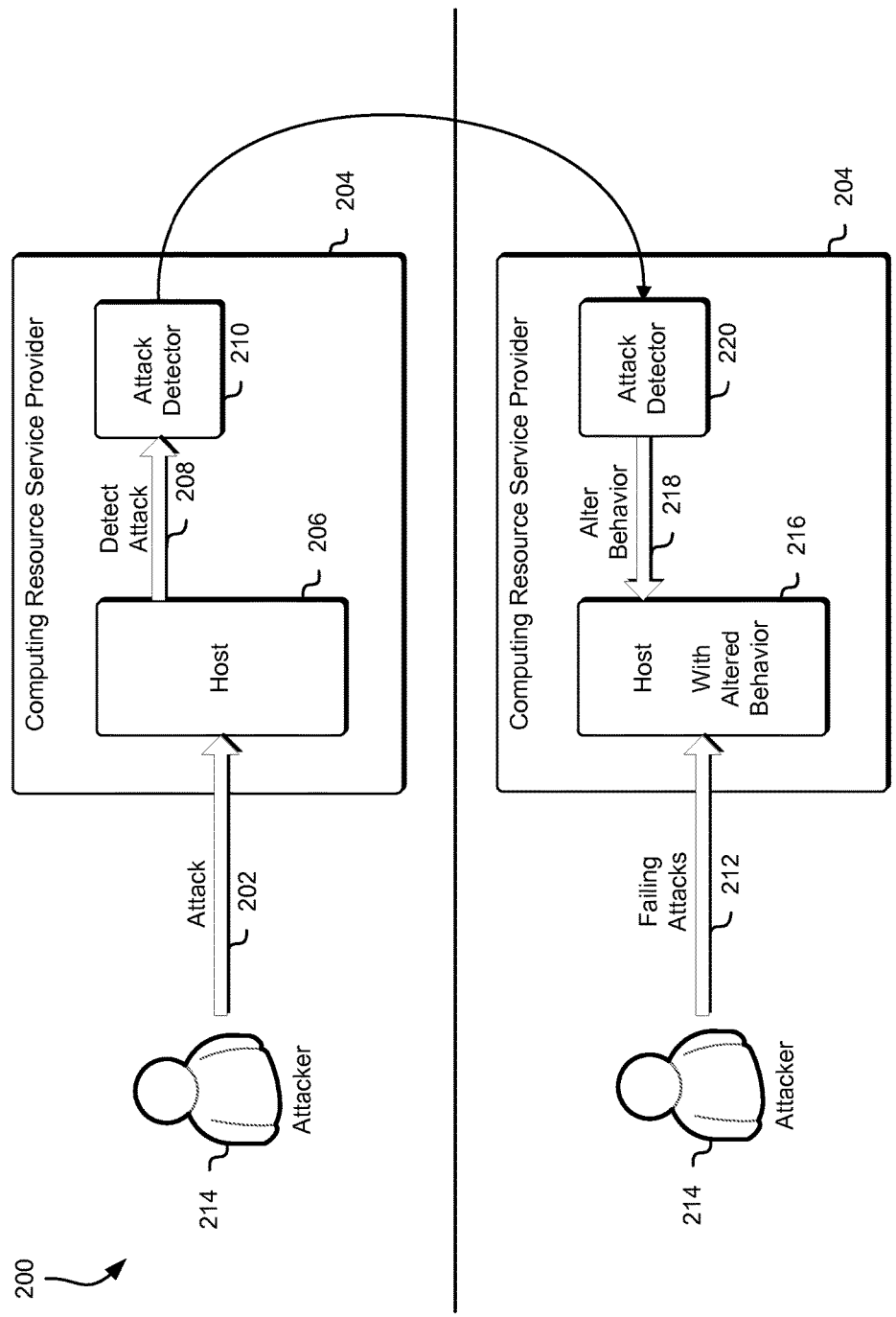
FIG. 2 illustrates an example environment where the behavior of a computer system is altered in response to a detected attack in accordance with at least one embodiment.

FIG. 2 illustrates an example environment 200 where, as a result of detecting an attack on host machine, a process or service alters the behavior of the host machine to delay and/or foil further attacks against the host machine, as described herein at least in connection with FIG. 1 and in accordance with at least one embodiment. An attacker 214 may initiate an attack 202 on a host computer system 206 running within a computer system environment such as a computing resource service provider environment 204. At the time of the attack, the host computer system 206 may not be aware that an attack is occurring. The attacker 214 may be an attacker such as the attacker 102 as described herein in connection with FIG. 1. The attack 202 may be an attack such as attack connection 114 or attack connection 118 as described herein in connection with FIG. 1. The host computer system (or server computer system) 206 may be a host computer system such as the host computer system 112 as described herein in connection with FIG. 1. The computer system environment such as a computing resource service provider 204 may be a computing resource service provider such as the computing resource service provider 110 as described herein at least in connection with FIG. 1.

When an attack occurs, an attack detector 210 may be configured to detect 208 the attack on the host computer system 206. The attack detector 210 may be a process, application, service and/or other such entity running on the host computer system 206, or may be a module incorporated as part of the host computer operating system, or may be a process, application, service, module and/or other such entity running as a separate service with the computing resource service provider 204 or may be a cooperative and/or distributed system running on a combination of these and/or other such entities. In some embodiments, the attack detector 210 may monitor and/or detect attacks on a plurality of host computer systems 206 within the computer system environment. The attack detector 210 may detect an attack by, for example, monitoring communications attempts with the host, logging suspicious behaviors by identified actors and evaluating the number and/or nature of such attacks against a system determined threshold value as described herein at least in connection with FIG. 1 and in accordance with at least one embodiment.

When an attack is detected, the attack detector 220 (which may be the same as the attack detector 210) may alter 218 the behavior of the host computer system 216 so that the host computer system thereafter responds to communications attempts from the attacker 214 with altered behavior. The attack detector 220 may alter 218 the behavior of the host by, for example, alerting the host as to the identity of the attacker 214, or by instantiating one or more analysis, modeling and/or imposter services to alter the behavior of the host such as the services described herein at least in connection with FIG. 1 or by some other such actions. The behavior of the host may be altered such that at least some of the subsequent attacks by attacker 214 may be failing attacks 212.

Figure 3:
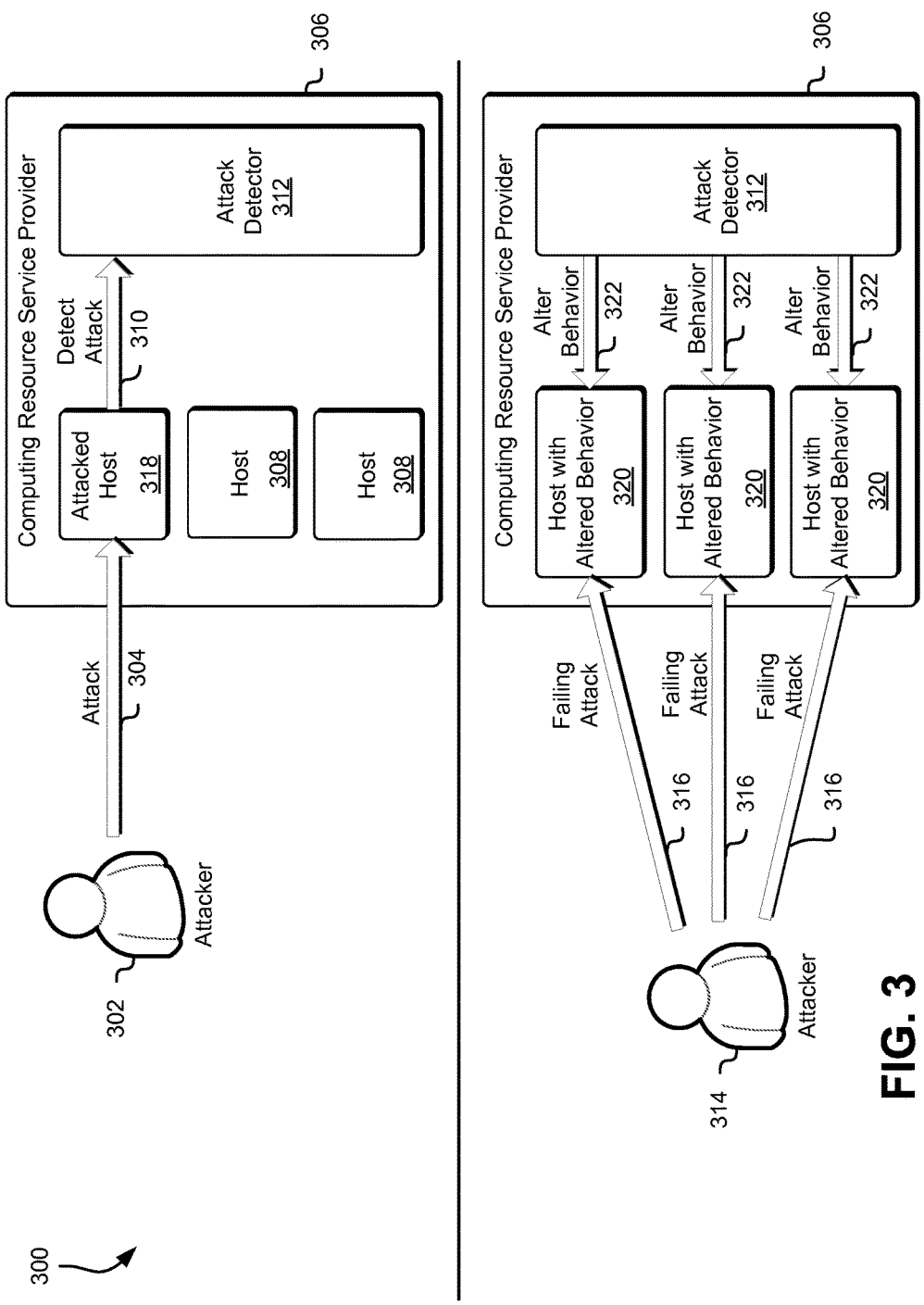
FIG. 3 illustrates an example environment where the behavior of a plurality of computer systems is altered in response to a detected attack on one of the computer systems in accordance with at least one embodiment.

FIG. 3 illustrates an example environment 300 where as a result of detecting an attack on host machine, a process or service alters the behavior of the host machine and of one or more other host machines in order to delay and/or foil further attacks against the host machines, as described herein at least in connection with FIG. 1 and in accordance with at least one embodiment. An attacker 302 may initiate an attack 304 on a host computer system 318 which may be one of a plurality of host computer systems 308 running within a computer system environment such as a computing resource service provider environment 306. At the time of the attack, the attacked host computer system 318 may not be aware that an attack is occurring. The attacker 302, the attack 304, the attacked host computer system 318 and the computing resource service provider 306 may be the same as the corresponding entities described herein at least in connection with FIGS. 1 and 2 and in accordance with at least one embodiment.

An attack detector 312 such as the attack detector 210 described herein in connection with FIG. 2 may detect 310 the attack 304 on the attacked host computer system 318. The attack detector 312 may detect 310 the attack in the same manner the attack detector 210 may detect 208 the attack as described herein at least in connection with FIG. 2 and in accordance with at least one embodiment. As a result of detecting the attack, the attack detector may alter 322 the behavior of the attacked host computer system 318 and also may, in some embodiments, alter the behavior of one or more of the other host computer systems 308 running within the computer system environment. The attack detector may alter 322 the behavior of the host computer systems by, for example, alerting the host computer systems of the existence of the attack and/or the identity of the attacker. The hosts with altered behavior 320 may then respond to subsequent attacks from the attacker so that they become failing attacks 316.

Figure 4:
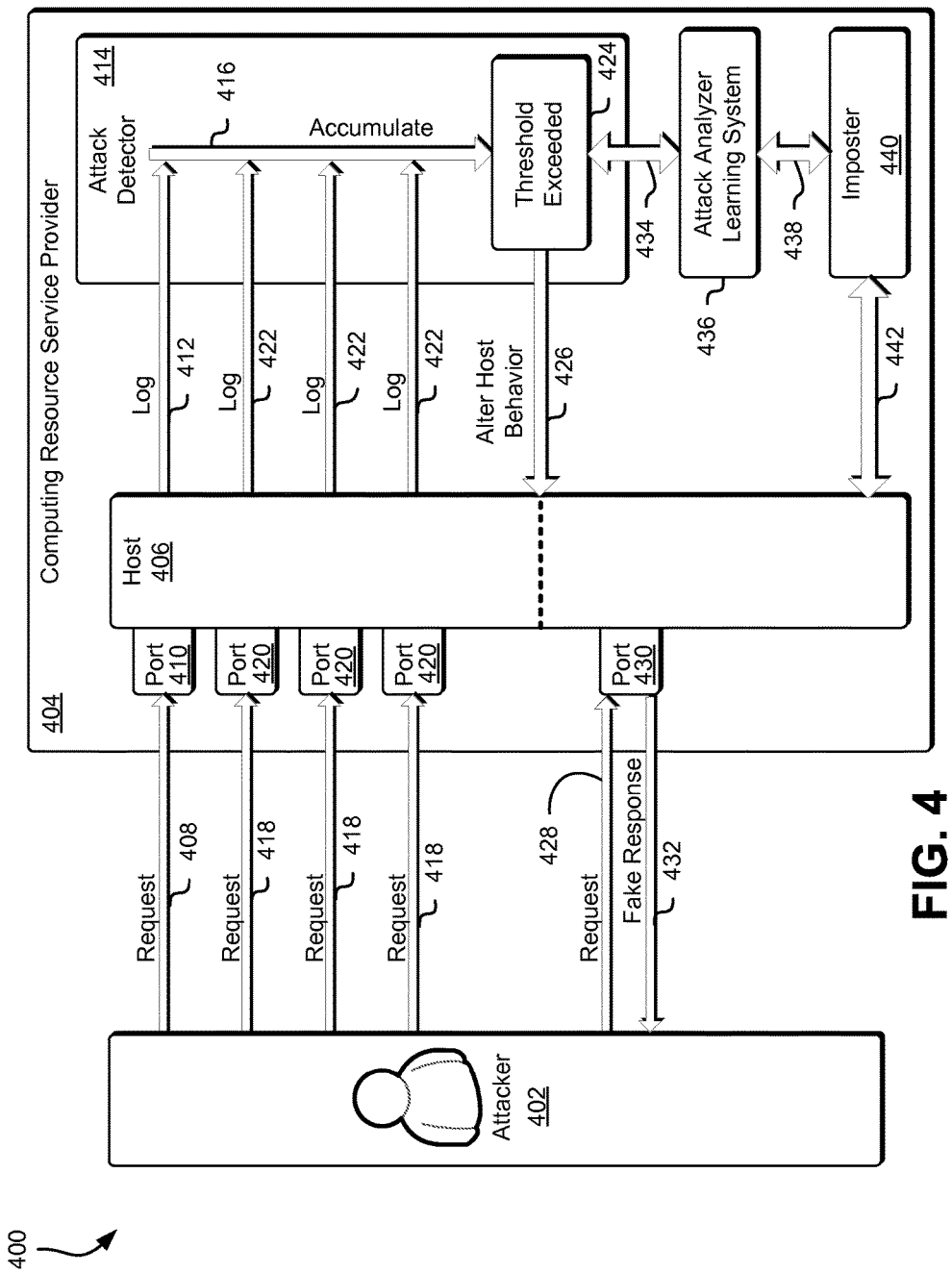
FIG. 4 illustrates an example environment where an attack against a computer system may be detected, delayed and foiled in accordance with at least one embodiment.

FIG. 4 illustrates an example environment 400 where a port-scan attack against a host computer system may be detected, delayed and/or foiled as described herein at least in connection with FIG. 1 and in accordance with at least one embodiment. An attacker 402 may initiate an attack such as a port-scan attack against a host computer system 406 running within a computing resource services provider 404 as described herein at least in connection with FIG. 1 and in accordance with at least one embodiment. The attacker 404 may initiate an attack such as a port-scan attack by first issuing a connection request 408 to a port 410 on the host computer system 406. The port 410 may be unused by any service running on the host computer system and, as a result of an attempt to connect to an unused port, the host computer system 406 may log 412 the connection request with an attack detector 414 such as the attack detector described herein at least in connection with FIG. 2. The attack detector 414 may begin accumulating 416 suspicious connection requests from the suspected attacker 402 to unused ports initially assuming that the connection request to an unused port was as a result of a mistake.

As the attacker continues sending connection requests 418 to unused ports 420 on the host computer system 406, the host computer system may continue logging 422 the connection requests with the attack detector 414 and the attack detector 414 may continue accumulating 416 suspicious connection requests from the suspected attacker 402. At some point, a threshold 424 may be exceeded, leading the attack detector to alter 426 the behavior of the host as described herein at least in connection with FIG. 2 and in accordance with at least one embodiment. In some embodiments, the attack detector may also alert 434 an attack analyzer learning system that may be configured to at least analyze the pattern of the attack and, in some embodiments, manage, alter, update and/or otherwise learn from existing and/or new attack patterns to better plan attack responses (responses to an attack and/or to an attacker). For example, an attack analyzer learning system may be configured to detect steps in an attack, or detect tools used in an attack, or detect a particular approach used by attackers and/or some other pattern recognition behaviors. An attack analyzer learning system may also be configured to recognize deviations from a known attack pattern and, in some embodiments, may be configured to generate new attack patterns from those deviations. In some embodiments, the attack analyzer learning system 436 may communicate 438 the results of the attack analysis to one or more imposters 440 which may at least assist 442 in altering the host behavior 426 as a result of the detected attack. After the host behavior is altered, a connection request 428 to an unused port 430 may receive a fake response 432 from the host, thereby at least giving the attacker a false positive result for the unused port 430.

Figure 5:
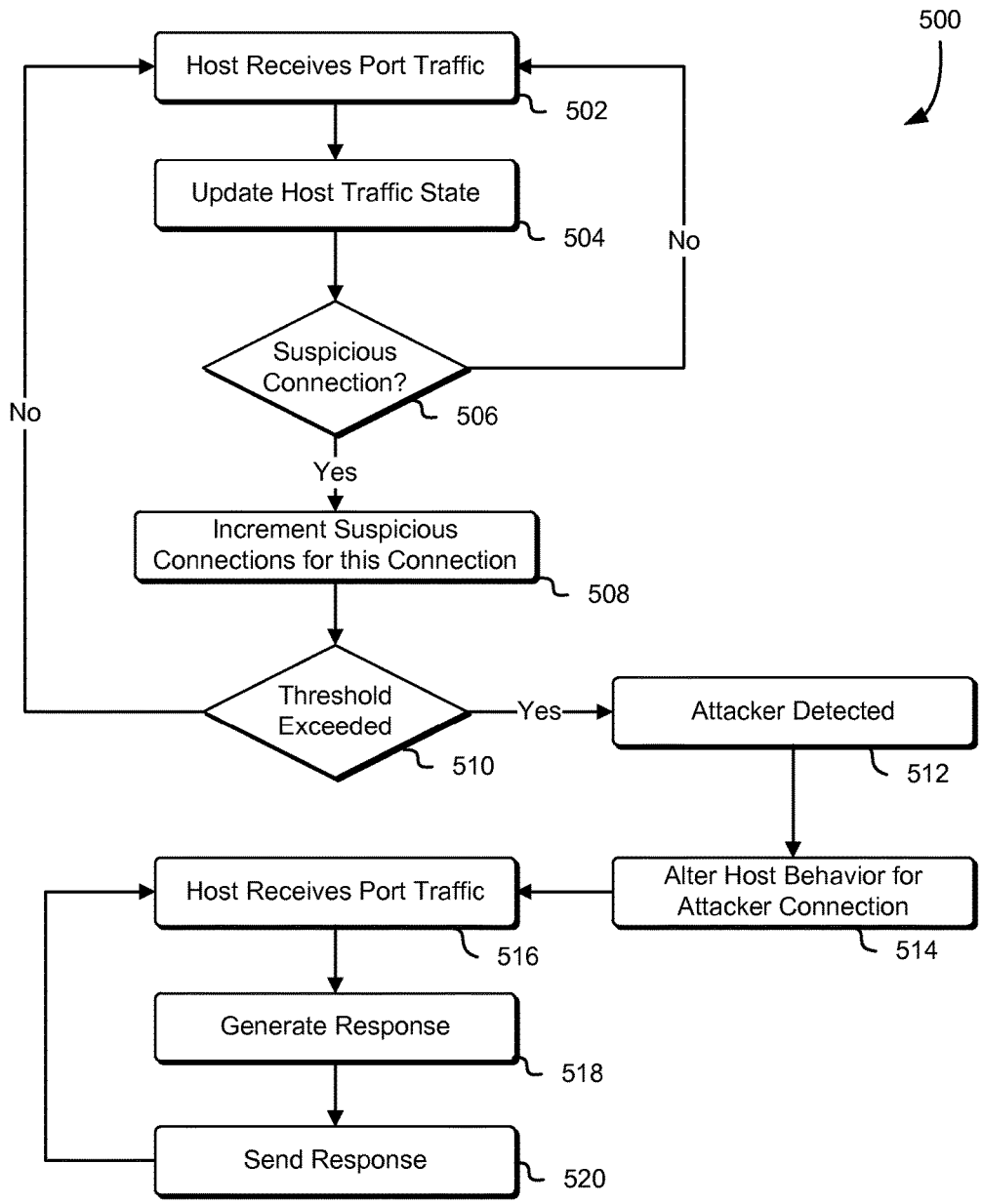
FIG. 5 illustrates an example process for monitoring connection requests and for identifying attackers, delaying attacks and foiling attacks in accordance with at least one embodiment.

FIG. 5 illustrates an example process 500 for monitoring connection requests, identifying attackers and delaying and/or foiling attacks on host computer systems as described at least in connection with FIG. 1 and in accordance with at least one embodiment. In some embodiments, a host computer system such as the host computer system 406 described at least in connection with FIG. 4 may perform a portion of process 500. In some embodiments, an attack detector such as the attack detector 414 described at least in connection with FIG. 4 may perform a portion of process 500. In some embodiments, an attack analyzer learning system such as the attack analyzer learning system 436 described at least in connection with FIG. 4 may perform a portion of process 500. In some embodiments, an imposter such as the imposter 440 described at least in connection with FIG. 4 may perform a portion of process 500. The combination of one or more host computer systems, attack detectors, attack analyzer learning systems and/or imposters may be referred to simply herein as "the host computer system."

A host computer system may receive 502 port traffic and, for at least a portion of the received port traffic may update 504 the host traffic state. In some embodiments, the host traffic state may be a record of the connection requests made by remote systems, processes, users and/or other such computer system entities, to the host computer system. In some embodiments, the host traffic state may be a record all connection requests. In some embodiments, the host traffic state may be a record of some connection requests such as, for example, those that arrive from suspicious hosts and/or those that engage in suspicious behaviors. In some embodiments, the host traffic state may include an aggregate score of the trustworthiness of a particular connection based at least in part on the connection requests made on that connection.

If the connection request is a suspicious connection request 506, the host computer system may increment 508 the suspicious connection requests for the connection. In some embodiments, a host computer system may determine if a threshold value 510 for suspicious connection requests for the connection has been exceeded and may, as a consequence, determine that an attacker is detected 512. In some embodiments, a host computer system may continue to receive 502 port traffic until a threshold value 510 for suspicious connection requests for the connection has been exceeded. In some embodiments, a host computer system may engage in one or more additional behaviors while receiving suspicious and/or potentially suspicious port traffic from a connection including, but not limited to, quarantining or partially quarantining some or all of the connection requests for the connection.

If it is determined that an attacker is detected 512, the behavior 514 of the host computer may be altered for the attacker connection. After the host behavior is altered, connection requests from the identified attacker may be received and/or responded to differently. Subsequent port traffic received 516 at the host computer system from the identified attacker may have an appropriate response generated 518 and sent 520 to the attacker. In some embodiments, the appropriate response may depend on one or more factors including, but not limited to, the nature of the attacker, the nature of the connection request, the type of attack, the tools and/or software used in the attack, the nature of the host, the nature of one or more of the services and/or applications running on the host and/or other such factors. For example, a port scan attack such as the port scan attack described herein at least in connection with FIG. 2 may have the connection requests to unused ports responded to with false positive connection responses and/or may have the connection requests to in-use ports responded to with no responses or with service appropriate responses. If the connection request is an email attack such as a phishing attack, the connection request may be responded to with scripted and/or automatically generated email responses. As may be contemplated, the example connection request responses listed herein are merely illustrative examples and other types of responses may be considered as within the scope of the present disclosure.

Figure 6:
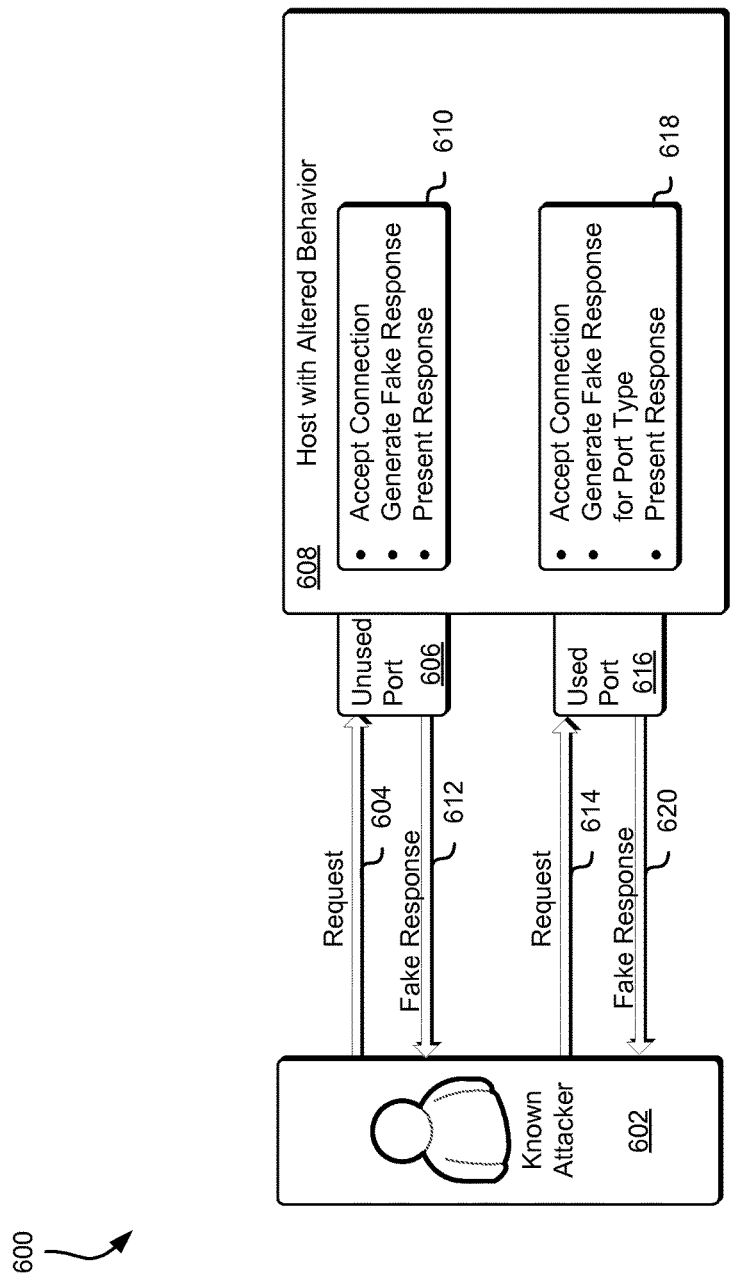
FIG. 6 illustrates an example environment where responses to communications requests from known attackers may be generated based at least in part on the port type in accordance with at least one embodiment.

FIG. 6 illustrates an example environment 600 where responses to communications requests from known attackers may be generated based at least in part on the port type of the communication request as described herein at least in connection with FIG. 2 and in accordance with at least one embodiment. A known attacker 602 may send a connection request 604 to an unused port 606 on a host computer system with altered behavior 608. The host computer system with altered behavior may have had its behavior altered for the known attacker 602 by the process described at least in connection with FIG. 5 and in accordance with at least one embodiment. In some embodiments, the altered behavior of the host may include 610 accepting the connection on the unused port, generating one or more fake responses and presenting the one or more fake responses to the known attacker. The fake response 612 received by the known attacker may be one of a plurality of fake responses sent by the host computer system with altered behavior, with such fake responses designed, for example, to present the known attacker 602 with an overwhelming set of false positive connections and thereby limiting the efficiency of the attack. In some embodiments, a fake response 612 may be presented to the known attacker 602 with long delays, or with many small packets, or with large packets, or with low bandwidth, or with other such delaying tactics to further limit the efficiency of the attack.

A known attacker 602 may also send a connection request 614 to an in-use and/or known port 616 on a host computer system with altered behavior 608. In some embodiments, the altered behavior of the host may include 618 accepting the connection on the in-use port, generating one or more fake responses for the port type and presenting the one or more fake responses to the known attacker. As described above, the fake response 620 received by the known attacker may be one of a plurality of fake responses sent by the host computer system with altered behavior. In some embodiments, the fake response 620 on an in-use and/or known port may include sending false service header responses that are appropriate to a service that may be running on the in-use and/or known port. For example, a connection request by a known attacker 602 to the HTTP port on a host with altered behavior may result in a response that is a realistic looking, but fake HTTP connection header. In some embodiments, the fake response on an in-use and/or known port may, for example, include not responding at all, thereby further obfuscating which ports are in-use on the host computer system and further confusing and/or delaying the attack. In some embodiments, a fake response 620 may also be presented to the known attacker 602 with such delaying tactics as were mentioned above, to further limit the efficiency of the attack.

Figure 7:
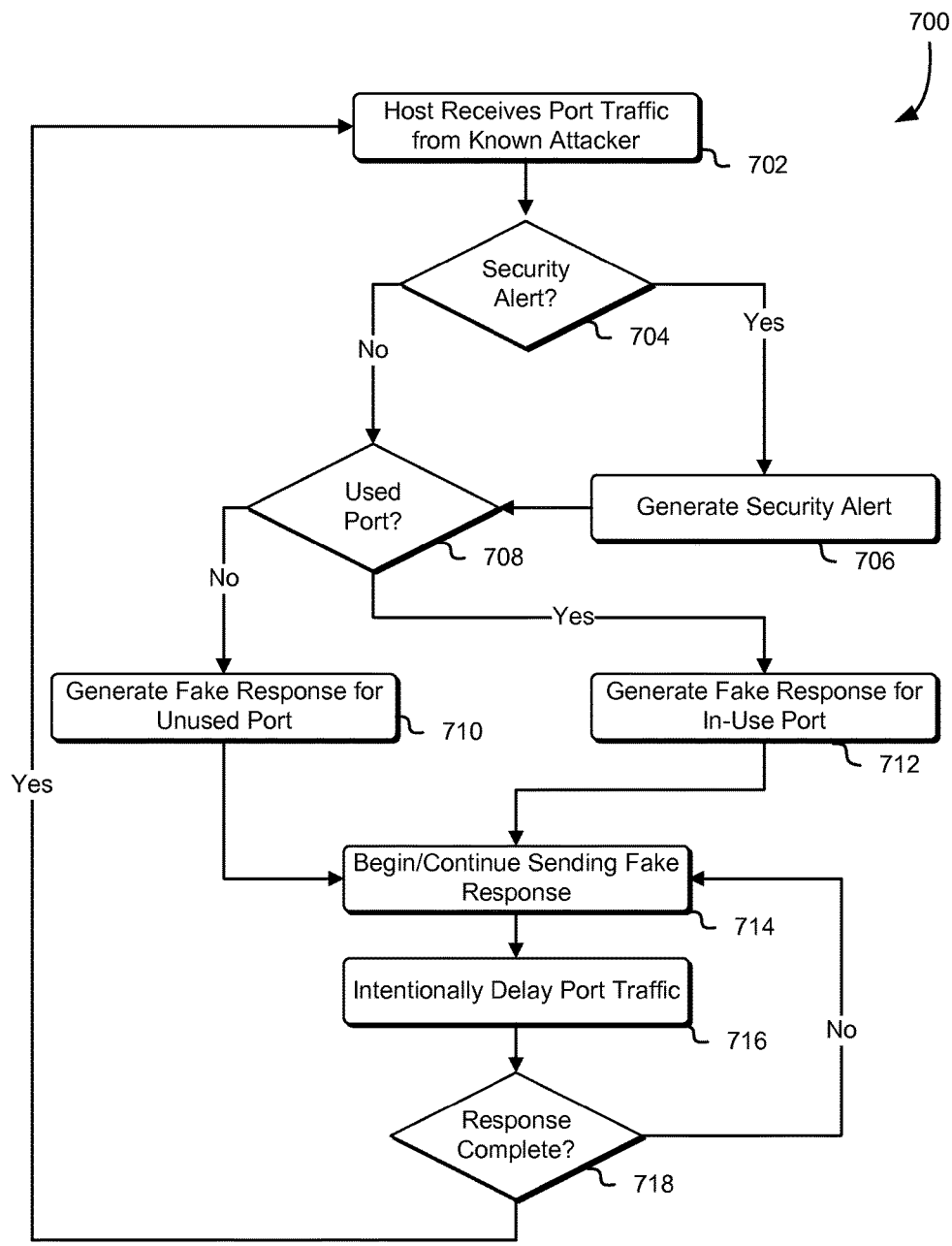
FIG. 7 illustrates an example process for receiving port traffic from a known attacker and for delaying and/or foiling the attack in accordance with at least one embodiment.

FIG. 7 illustrates an example process 700 for receiving port traffic from a known attacker and for delaying and/or foiling (or frustrating) the attack as described herein at least in connection with FIG. 2 and in accordance with at least one embodiment. In some embodiments, a host computer system such as the host computer system 406 described at least in connection with FIG. 4 may perform a portion of process 700. In some embodiments, an attack detector such as the attack detector 414 described at least in connection with FIG. 4 may perform a portion of process 700. In some embodiments, an attack analyzer learning system such as the attack analyzer learning system 436 described at least in connection with FIG. 4 may perform a portion of process 700. In some embodiments, an imposter such as the imposter 440 described at least in connection with FIG. 4 may perform a portion of process 700. The combination of one or more host computer systems, attack detectors, attack analyzer learning systems and/or imposters may be referred to simply herein as "the host computer system."

A host computer system with altered behavior may receive 702 port traffic from a known attacker. The host computer system with altered behavior may have had its behavior altered by the process described at least in connection with FIG. 5 and in accordance with at least one embodiment. As a result of receiving 702 port traffic from a known attacker, a host computer system may determine whether 704 a security alert should be issued and if so, may generate 706 a security alert. In some embodiments, a host computer system may generate a security alert for each connection request, or for each connection or for each attacker. In some embodiments, a security alert may be generated and sent to one or more other host computer systems within a computer system environment.

A host computer system may then determine 708 whether the connection request is for an in-use and/or known port and, if so, may generate 712 a fake response for the in-use and/or known port as described herein at least in connection with FIG. 6 and in accordance with at least one embodiment. If the port is unused, a host computer system may generate 710 a fake response for the unused port as described herein at least in connection with FIG. 6 and in accordance with at least one embodiment. The host computer system may then begin 714 sending the fake response and may, in some embodiments, 716 intentionally delay the port traffic. The host computer system may continue sending the fake response to the known attacker until 718 the response is complete.

Figure 8:
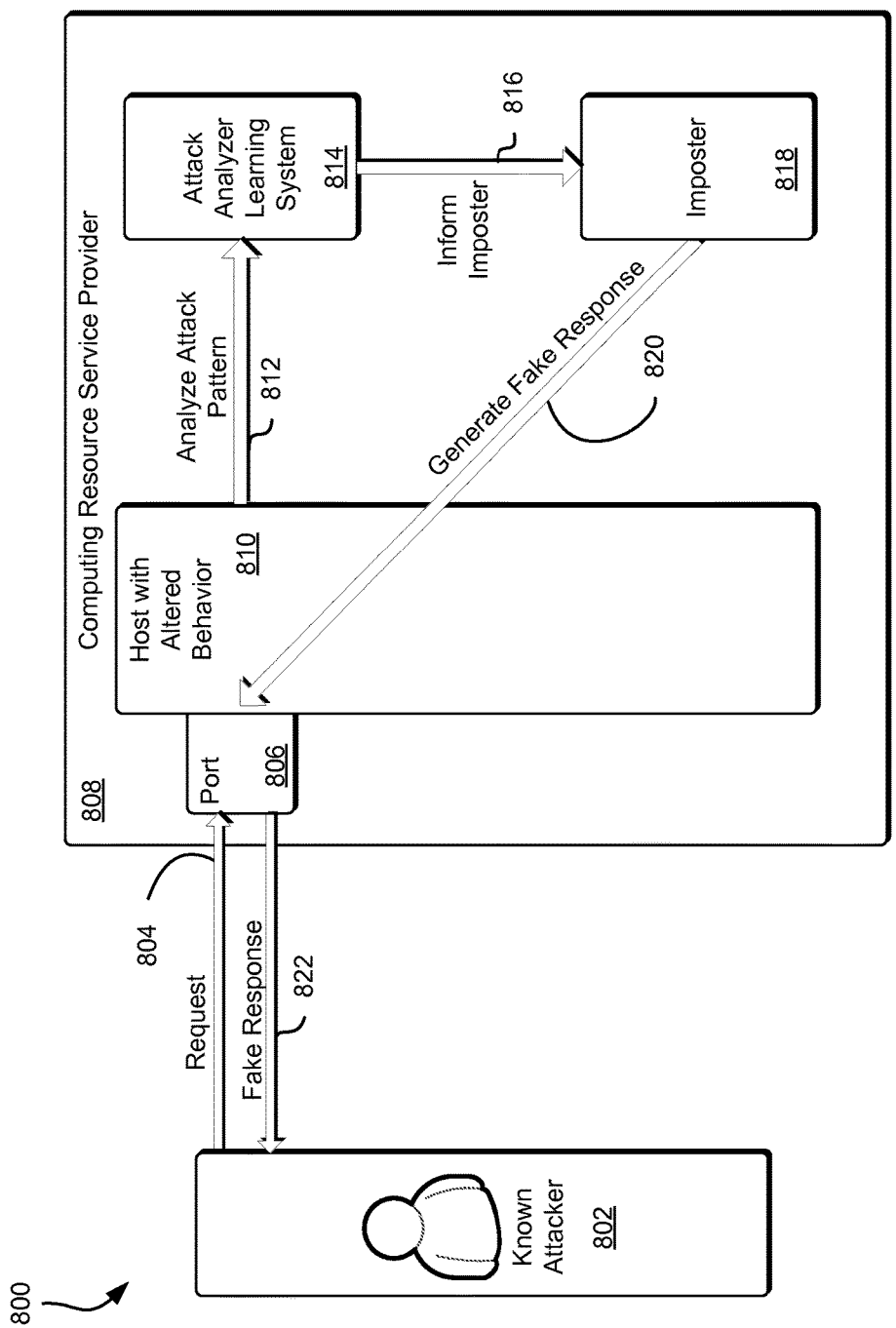
FIG. 8 illustrates an example environment where responses to connection requests from known attackers may be generated in accordance with at least one embodiment.

FIG. 8 illustrates an example environment 800 where responses to connection requests from known attackers may be generated by attack analyzer learning systems and/or imposters as described herein at least in connection with FIG. 4 and in accordance with at least one embodiment. A known attacker 802 may send a connection request 804 to a port 806 on a host computer system with altered behavior 810 running within a computer system environment such as a computing resource service provider 808. The host computer system with altered behavior may have had its behavior altered for the known attacker 802 by the process described at least in connection with FIG. 5 and in accordance with at least one embodiment.

The host computer system with altered behavior 810 may first request that an attack analyzer learning system 814 analyze the attack pattern 812 as described herein at least in connection with FIG. 4 and in accordance with at least one embodiment. In some embodiments, the attack analyzer learning system may 816 inform an imposter 818, which may then generate 820 a fake response and that fake response 822 may be sent to the known attacker 802. In some embodiments, the fake response 822 may include a number of different response types that may be configured to delay and/or foil the attack. The fake response 822 may, for example, include false answers to queries by the known attacker 802 so that the known attacker 802 may not receive accurate information about the host computer system. The fake response 822 may also include queries to the known attacker 802 so that the host computer system may gather identifying information about the host attacker including, but not limited to, information about the location of the attacker, the identity of the attacker, the ISP of the attacker, the tools used by the attacker and other such information.

Figure 9:
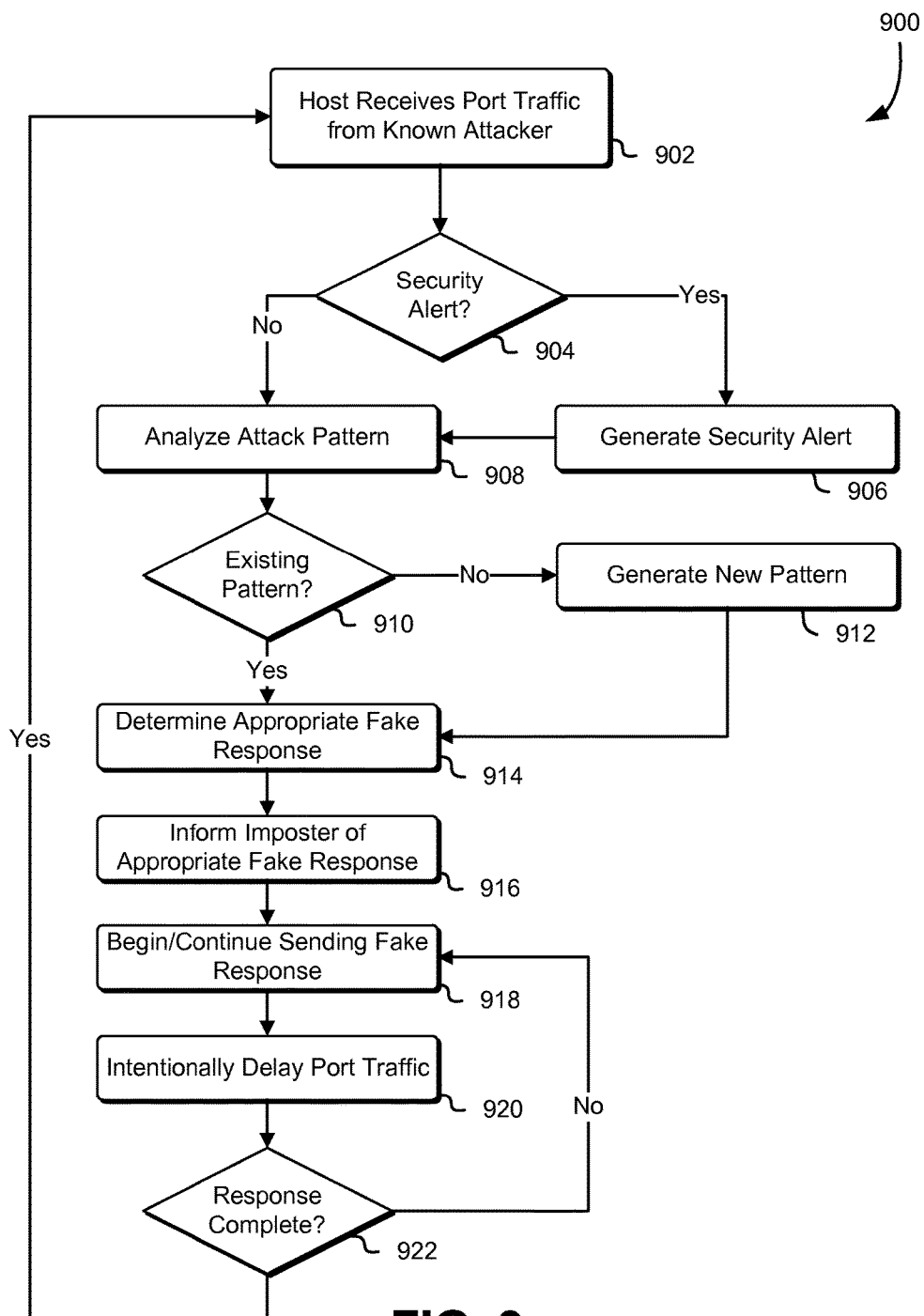
FIG. 9 illustrates an example process for receiving port traffic from a known attacker, for analyzing the attack pattern and for using that analysis to delay and/or foil the attack in accordance with at least one embodiment.

FIG. 9 illustrates an example process 900 for receiving port traffic from a known attacker, for analyzing the attack pattern and for using that analysis to delay and/or foil the attack as described herein at least in connection with FIG. 2 and in accordance with at least one embodiment. In some embodiments, a host computer system such as the host computer system 406 described at least in connection with FIG. 4 may perform a portion of process 900. In some embodiments, an attack detector such as the attack detector 414 described at least in connection with FIG. 4 may perform a portion of process 900. In some embodiments, an attack analyzer learning system such as the attack analyzer learning system 436 described at least in connection with FIG. 4 may perform a portion of process 900. In some embodiments, an imposter such as the imposter 440 described at least in connection with FIG. 4 may perform a portion of process 900. The combination of one or more host computer systems, attack detectors, attack analyzer learning systems and/or imposters may be referred to simply herein as "the host computer system."

A host computer system with altered behavior may receive 902 port traffic from a known attacker. The host computer system with altered behavior may have had its behavior altered by the process described at least in connection with FIG. 5 and in accordance with at least one embodiment. As a result of receiving 902 port traffic from a known attacker, a host computer system may determine whether a security alert 904 should be issued and if so, may generate 906 a security alert as described herein at least in connection with FIG. 7 and in accordance with at least one embodiment.

A host computer system may then analyze 908 the attack pattern by first determining whether the attack coming from the known attacker is an existing pattern 910 that is recognized by the host computer system. In some embodiments, the host computer system may be configured to analyze attack patterns to recognize certain repeated steps, or certain software and/or tools used in the attack, or certain attackers, or other such pattern elements of an attack. If the pattern is not an existing pattern 910, the host computer system may 912 generate a new pattern which may, in some embodiments, be based on one or more previous patterns and may be generated using, for example, an expert system and/or some other such learning-based system. A host computer system may then determine 914 an appropriate fake response for the attack type and in some embodiments, may inform 916 an imposter such as the imposter described herein at least in connection with FIG. 8 and in accordance with at least one embodiment, of the fake response. The host computer system may then begin sending 918 the fake response and may, in some embodiments, intentionally delay 920 the port traffic. The host computer system may continue sending the fake response to the known attacker until 922 the response is complete.

Figure 10:
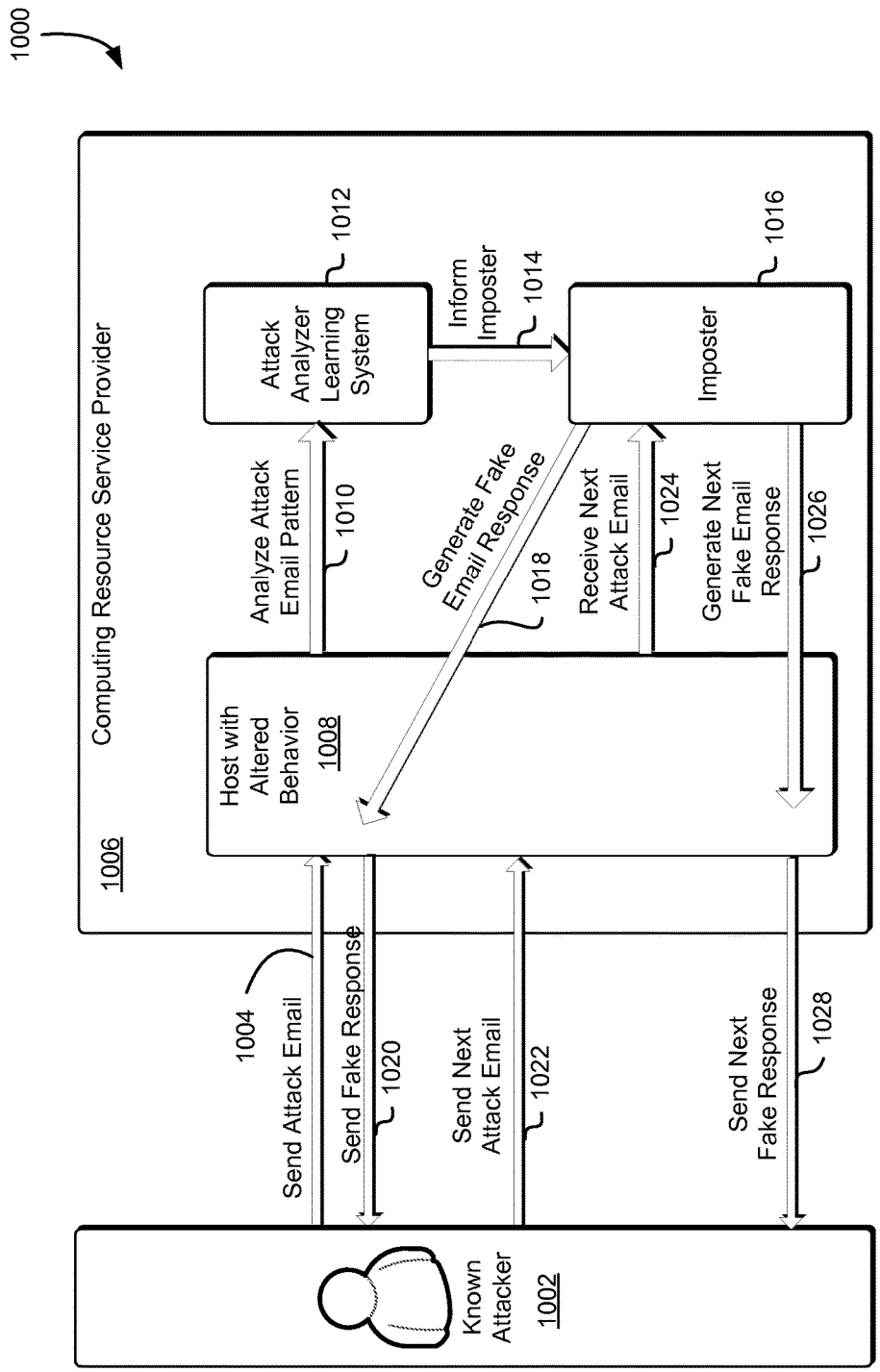
FIG. 10 illustrates an example environment where responses to attack emails from known attackers may be generated in accordance with at least one embodiment.

FIG. 10 illustrates an example environment 1000 where responses to attack emails from known attackers may be generated by attack analyzer learning systems and/or imposters as described herein at least in connection with FIG. 4 and in accordance with at least one embodiment. A known attacker 1002 may send an attack email 1004 to a host computer system with altered behavior 1008 running within a computer system environment such as a computing resource service provider 1006. The host computer system with altered behavior may have had its behavior altered for the known attacker 1002 by the process described at least in connection with FIG. 5 and in accordance with at least one embodiment.

The host computer system with altered behavior 1008 may first request that an attack analyzer learning system 1012 analyze the attack pattern 1010 as described herein at least in connection with FIG. 4 and in accordance with at least one embodiment. In some embodiments, the attack analyzer learning system may inform 1014 an imposter 1016, which may then generate 1018 a fake email response and that fake email response 1020 may be sent to the known attacker 1002. In some embodiments, the fake email response 1020 may include a number of different response types that may be configured to delay and/or foil the attack. The fake email response 1020 may, for example, include false answers to email queries by the known attacker 1002 so that the known attacker 1002 may not receive accurate information about the host computer system and/or the targeted user. The fake email response 1020 may also include queries to the known attacker 1002 so that the host computer system may gather identifying information about the host attacker including, but not limited to, information about the location of the attacker, the identity of the attacker, the ISP of the attacker and other such information. In some embodiments, the attack analyzer learning system 1012 may initiate a response chain of emails to be sent by the imposter 1016 in order to, for example, mimic the responses of a human user and to consequentially delay and/or foil the email attack. For example, the fake email response 1020 may include a query to the known attacker 1002 for further information which may then cause the known attacker 1002 to send a next attack email 1022 that may be received by the imposter, triggering the generation 1026 of a next fake email response that may be 1028 sent to the known attacker 1002.

In some embodiments, the response chain of emails sent to the known attacker 1002 may continue through several iterations over the course of a significant length of time.

Figure 11:
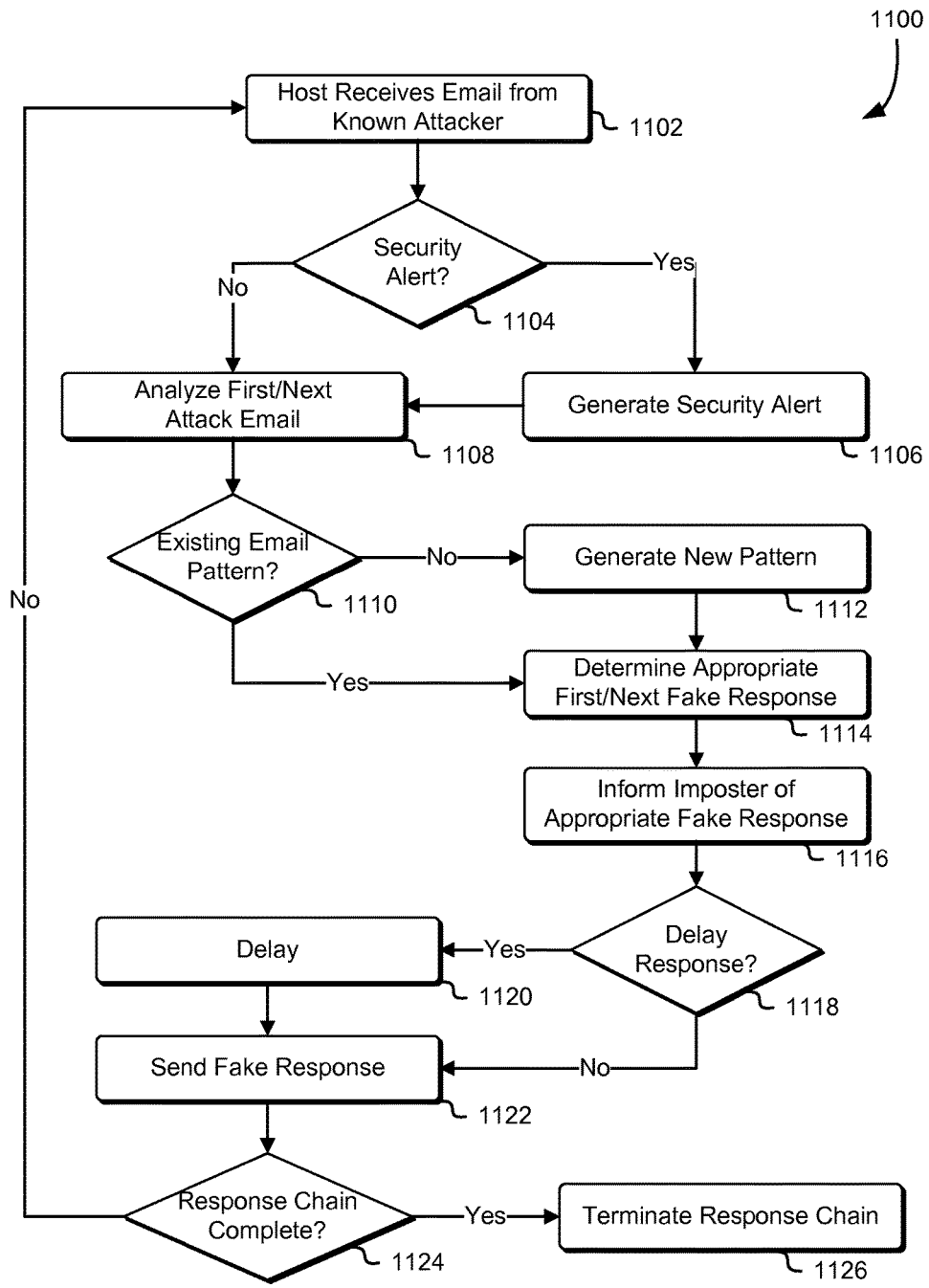
FIG. 11 illustrates an example process for receiving email traffic from a known attacker, for analyzing the email attack pattern and for using that analysis to delay and/or foil the email attack in accordance with at least one embodiment.

FIG. 11 illustrates an example process 1100 for receiving email traffic from a known attacker, for analyzing the email attack pattern and for using that analysis to delay and/or foil the email attack as described herein at least in connection with FIG. 2 and in accordance with at least one embodiment. In some embodiments, a host computer system such as the host computer system 406 described at least in connection with FIG. 4 may perform a portion of process 1100. In some embodiments, an attack detector such as the attack detector 414 described at least in connection with FIG. 4 may perform a portion of process 1100. In some embodiments, an attack analyzer learning system such as the attack analyzer learning system 436 described at least in connection with FIG. 4 may perform a portion of process 1100. In some embodiments, an imposter such as the imposter 440 described at least in connection with FIG. 4 may perform a portion of process 1100. The combination of one or more host computer systems, attack detectors, attack analyzer learning systems and/or imposters may be referred to simply herein as "the host computer system."

A host computer system with altered behavior may receive 1102 email from a known attacker. The host computer system with altered behavior may have had its behavior altered by the process described at least in connection with FIG. 5 and in accordance with at least one embodiment. As a result of receiving 1102 email from a known attacker, a host computer system may determine whether a security alert 1104 should be issued and if so, may generate 1106 a security alert as described herein at least in connection with FIG. 7 and in accordance with at least one embodiment.

A host computer system may then analyze 1108 the attack email by first determining whether the attack email coming from the known attacker is 1110 an existing email pattern that is recognized by the host computer system. If the pattern is not an existing pattern 1110, the host computer system may generate 1112 a new pattern as described herein at least in connection with FIG. 9 and in accordance with at least one embodiment. A host computer system may then determine 1114 an appropriate fake response for the attack email type and in some embodiments, may inform 1116 an imposter such as the imposter described herein at least in connection with FIG. 8 and in accordance with at least one embodiment, of the fake email response. The host computer system may then 1118 determine whether the response should be delayed before sending. In some embodiments, a host computer system may determine that an attack may be further delayed and/or foiled by delaying the fake email response for a significant period of time. An email response from a human may take hours or even days and the host computer system may, in some embodiments, determine that mimicking human behavior in responding to emails may be beneficial in delaying and/or foiling the email attack. After the host computer system 1122 sends the fake response, the host computer system may determine 1124 whether further emails may be sent and/or received by the attacker and if not, may terminate 1126 the email response chain. The host computer system may determine whether further emails may be sent and/or received by the attacker based on, for example, the attack pattern, or by actions of the imposter, or by a combination of these and/or other such conditions.

Figure 12:
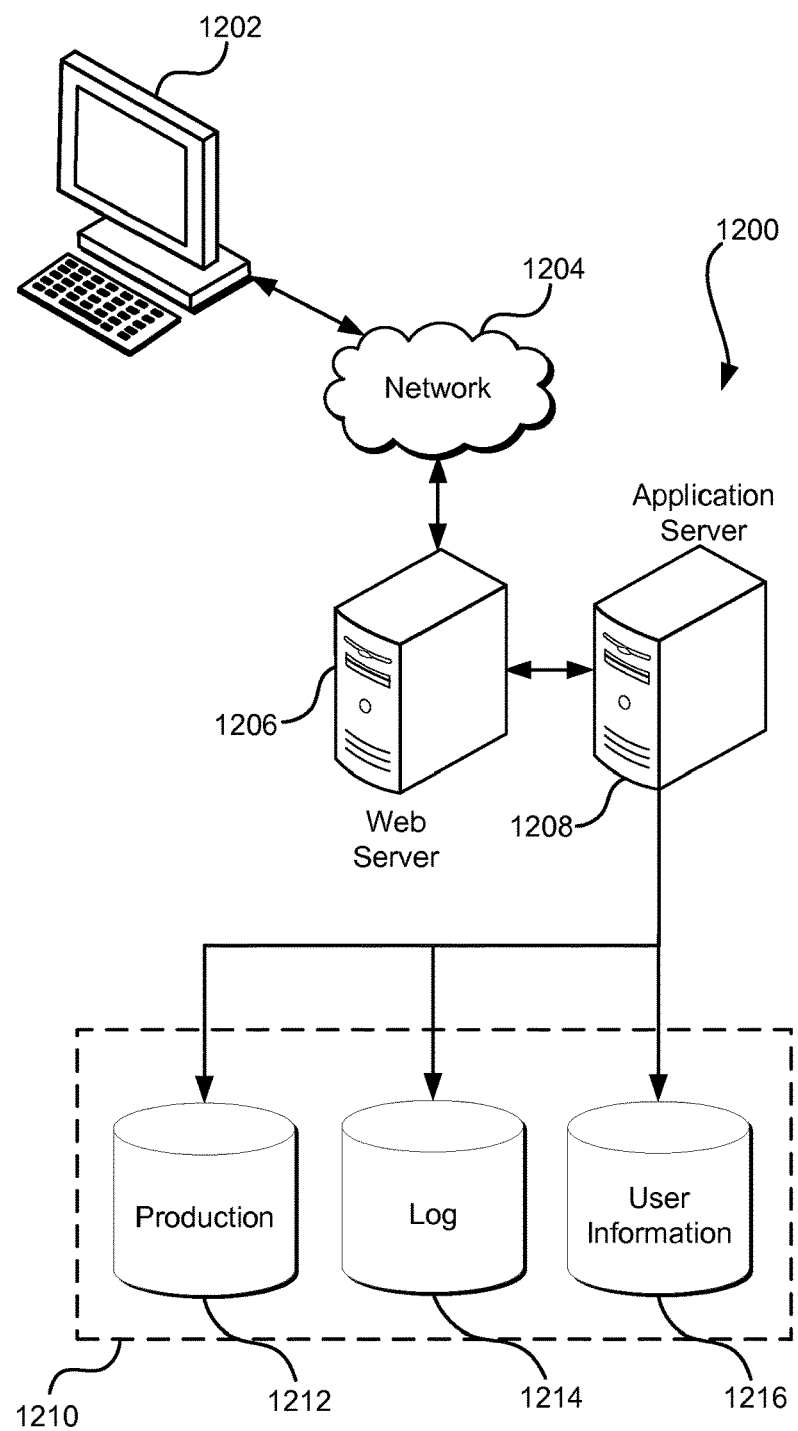
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

Embodiments of the disclosure can be described in view of the following clauses:

1. A computer-implemented method for enhancing security, comprising:
   under the control of one or more computer systems configured with executable instructions,
   monitoring connection attempts to a server computer system;
   detecting, as part of said monitoring, an in-progress port scan of the server computer system by an attacker computer system;
   as a result of detecting the in-progress port scan, modifying the server computer system to:
   accept connection attempts at least from the attacker computer system on both a first set of ports open until detecting the in-progress port scan and a second set of ports closed for an amount of time until detecting the in-progress port scan; and
   provide attack responses to the attacker computer system from at least a first subset of the first set of ports and at least a second subset of the second set of ports, the attack responses from the first subset of the first set of ports configured to be different than responses that would have been provided to the attacker computer system had the in-progress port scan been undetected.

2. The computer-implemented method of clause 1, wherein the attack responses further comprise at least one response throttled as a result of the in-progress port scan being detected.

3. The computer-implemented method of clauses 1 or 2, wherein the attack responses further comprise at least one response delayed to the attacker computer system as a result of the in-progress port scan being detected.

4. The computer-implemented method of clauses 1 to 3, wherein the attack responses further comprise at least one response configured to cause the attacker computer system to expend computing resources to process the response.

5. The computer-implemented method of clauses 1 to 4, wherein the attack responses further comprise at least one response falsely indicating the existence of a particular service behind a particular port of the second set of ports.

6. The computer-implemented method of clauses 1 to 5, wherein the attack responses further comprise at least one response misidentifying a service behind a particular port of the first set of ports.

7. A system, comprising at least one computing device configured to implement one or more services and, as part of implementing the one or more services, the system configured to:
   detect malicious interaction with the system by an attacker computer system;
   as a result of detecting a malicious interaction, modify the system to alter a set of communication channels for at least the attacker computer system as a result of detecting the malicious interaction; and
   provide, via at least a subset of the set of altered communication channels and as a result of detecting the malicious interaction, communications configured for use during an attack on the system.

8. The system of clause 7, wherein the malicious interaction further comprises a port scan of ports of the system.

9. The system of clauses 7 or 8, wherein the set of communication channels further comprise ports associated with a same Internet protocol address of the system.

10. The system of clauses 7 to 9, wherein the communications configured for use during the attack on the system further include at least some communications configured to delay detection, by the attacker computer system, of a service accessible via a communication channel that is one of a subset of communications channels that were open before detecting the malicious interaction of the set of communications channels.

11. The system of clauses 7 to 10, wherein the system is further configured to, after detection of the malicious interaction, dynamically generate at least some of the communications based at least in part on one or more observed behaviors of the attacker.

12. The system of clauses 7 to 11, wherein at least one of the communications falsely indicates existence of a service accessible via a communication channel that is one of a subset of communications channels that were closed before detecting the malicious interaction of the set of communications channels.

13. The system of clauses 7 to 12, wherein the one or more services configured to modify the system to alter a set of communication channels for at least the attacker computer system are further configured to:
   open, for at least the attacker computer system, a subset of a subset of communications channels that were closed before detecting the malicious interaction of the set of communications channels; and
   close, for at least the attacker computer system, a subset of a subset of communications channels that were open before detecting the malicious interaction of the set of communications channels.

14. A non-transitory computer-readable storage medium having collectively stored thereon executable instructions that, when executed by one or more processors of a computer system, cause the computer system to at least:
   inhibit an attacker computer system that is able to communicate with the computer system using a set of open communication channels by causing the computer system to at least:
   alter the set of open communication channels that the attacker computer system is able to use to communicate with the computer system; and
   communicate, over at least a subset of the altered set of communication channels, with the attacker computer system in a manner configured for use in response to detected malicious interaction.

15. The non-transitory computer-readable storage medium of clause 14, wherein the instructions that cause the computer system to inhibit the attacker computer system further comprise instructions that cause the computer system to:
   open a subset of a set of communications channels that are not members of the set of open communications channels; and
   close a subset of the set of open communications channels.

16. The non-transitory computer-readable storage medium of clauses 14 or 15, wherein the instructions that cause the computer system to inhibit the attacker computer system further cause the computer system to present one or more fake services to the attacker computer system thereby causing the attacker computer system to expend resources interacting with the one or more fake services.

17. The non-transitory computer-readable storage medium of clauses 14 to 16, wherein the instructions further include instructions that, when executed by the one or more processors, cause the computer system to transmit one or more notifications of a detected malicious interaction before or during inhibition of the attacker computer system.

18. The non-transitory computer-readable storage medium of clauses 14 to 17, wherein:

the instructions that cause the computer system to alter the set of open communication channels through which the attacker computer system is able to communicate with the computer system comprises opening one or more ports for at least the attacker computer system;

the instructions that cause the computer system to communicate with the attacker computer system comprises allowing the attacker computer system to establish a connection on the one or more ports; and the instructions that cause the computer system to inhibit the attacker computer system further cause the computer system to detect the connection and subsequently terminate the connection.

19. The non-transitory computer-readable storage medium of clauses 14 to 18, wherein the instructions that cause the computer system to alter the set of open communication channels that the attacker computer system is able to use to communicate with the computer system do not alter the set of open communications channels that a non-attacker computer system that is different from the attacker computer system is able to use to communicate with the computer system.

20. The non-transitory computer-readable storage medium of clauses 14 to 19, wherein the instructions that cause the computer system to inhibit the attacker computer system cause the computer system to provide information to the attacker computer system at a rate that, as a result of the malicious interaction being detected, is slower than the computer system is capable of providing the information.

21. The non-transitory computer-readable storage medium of clauses 14 to 20, wherein the instructions further include instructions that cause the computer system to monitor one or more external processes that are configured to generate a security alarm after the one or more external processes detect a computer implemented attack.

22. A computer-implemented method for enhancing security, comprising:

under the control of one or more computer systems configured with executable instructions, detecting an attack, by an attacker, on a computer system;

determining a profile of the attacker from a set of profiles based at least in part on attack types;

directing the attacker, using a transparent redirection method, to an automated imposter;

using the automated imposter to interact with the attacker by at least, for individual communications of a set of communications received from the attacker, generating a response based at least in part on the communication, the determined profile and a response engine; and causing the generated response to be transmitted to the attacker;

using at least a subset of the set of communications to train the response engine; and using the trained response engine to interact with at least one additional attacker.

23. The computer-implemented method of clause 22, wherein the set of communications further comprise electronic mail communications.

24. The computer-implemented method of clauses 22 or 23, wherein:

the method further comprises generating a virtual environment for the attacker that simulates the computer system; and using the automated imposter to interact with the attacker includes interacting with the attacker via the generated virtual environment.

25. The computer-implemented method of clauses 22 to 24, further comprising:

collecting information about the attacker based at least in part on at least a subset of the communications; and reporting the collected information.

26. The computer-implemented method of clauses 22 to 25, further comprising:

detecting a previously unrecorded attack type; and updating the set of profiles to include a profile corresponding to the detected previously unrecorded attack type.

27. The computer-implemented method of clauses 22 to 26, further comprising:

the set of communications are directed to an account associated with the computer system; and using the automated imposter to interact with the attacker comprises intercepting individual communications of at least a subset of the set of communications and preventing the intercepted communication from being accessible to a user of the account.

28. A system, comprising one or more computing devices configured to implement one or more services, the one or more services operating to cause the system to implement at least:

a detector configured to detect a computer-implemented attack by an attacker;

a profiler configured to determine, based at least in part on behavior of the attacker, an attack profile of the detected attack, the profile determined from a plurality of attack profiles; and an imposter configured to, based at least in part on the determined attack profile, determine one or more simulations and communicate with the attacker in accordance with the determined one or more simulations.

29. The system of clause 28, wherein the system is further configured to:

implement the detector such that the detector is further configured to detect a coordinated computer-implemented attack by a plurality of cooperating attackers; and implement the imposter such that the imposter is further configured to communicate with individual attackers of the plurality of cooperating attackers in accordance with the determined one or more simulations.

30. The system of clauses 28 or 29, wherein the profiler is further configured to add profiles as a result of detection of previously unrecorded attack types detected by the detector.

31. The system of clauses 28 to 30, wherein the imposter is further configured to communicate with the attacker in accordance with the determined one or more simulations by at least providing information about one or more simulated users to the attacker.

32. The system of clauses 28 to 31, wherein the system is further configured to:
record actions of the attacker in connection with a simulated system;
detect a security breach of the attacker caused by the actions; and
provide a record of the recorded actions and the security breach.

33. The system of clauses 28 to 32, wherein the determined one or more simulations are dependent at least in part on at least one communication from the attacker.

34. The system of clauses 28 to 33, wherein the profiler is further configured to perform an analysis of the attack profile of the detected attack and based at least in part on the analysis of the attack profile, to add one or more new attack profiles.

35. A non-transitory computer-readable storage medium having collectively stored thereon executable instructions that, when executed by one or more processors of a computer system, cause the computer system to at least:
detect a computer-implemented attack by one or more attackers;
select, based at least in part on one or more interactions of the one or more attackers with the system, one or more attack profiles of the detected attack from a plurality of attack profiles; and
cause an imposter to, based at least in part on the selected one or more attack profiles, determine a simulation and communicate with one or more of the one or more attackers in accordance with the determined simulation.

36. The non-transitory computer-readable storage medium of clause 35, wherein the instructions further comprise instructions that, when executed by the one or more processors, cause the computer system to update the plurality of attack profiles based at least in part on behavior of the one or more attackers.

37. The non-transitory computer-readable storage medium of clauses 35 or 36, wherein:
the detected attack targets an computer system account; and
the instructions that cause the computer system to communicate with the one or more of the one or more attackers in accordance with the determined simulation further cause the computer system to impersonate a user of the account.

38. The non-transitory computer-readable storage medium of clauses 35 to 37, wherein the instructions that cause the computer system to communicate with the one or more of the one or more attackers in accordance with the determined simulation further cause the computer system to simulate, to the one or more of the one or more attackers, the computer system.

39. The non-transitory computer-readable storage medium of clauses 35 to 38, wherein the instructions that cause the computer system to communicate with the one or more of the one or more attackers in accordance with the determined simulation further cause the computer system to:
provide credentials to the one or more of the one or more attackers for accessing an account; and
record use, by the one or more of the one or more attackers, of the provided credentials for access to the account.

40. The non-transitory computer-readable storage medium of clauses 35 to 39, wherein the instructions that cause the computer system to communicate with the one or more of the one or more attackers in accordance with the determined simulation further cause the computer system to obtain identifying information about the one or more of the one or more attackers.

41. The non-transitory computer-readable storage medium of clauses 35 to 40, wherein the instructions further comprise instructions that, when executed by the one or more processors, cause the computer system to generate a security alarm after the computer system detects the computer-implemented attack by the one or more of the one or more attackers.

42. The non-transitory computer-readable storage medium of clauses 35 to 41, wherein the instructions that cause the computer system to detect the computer-implemented attack further include instructions that cause the computer system to monitor one or more external processes that are configured to generate a security alarm after the one or more external processes detect a computer implemented attack.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
    detecting an attack, by an attacker, on a computer system, based at least in part on a first set of communications from the attacker to a network address associated with the computer system;
    determining an attack type of the attack based at least in part on the first set of communications;
    instantiating an imposter service on the computer system based at least in part on the attack type; and
    transparently directing a second set of communications from the attacker to the imposter service, to cause the imposter service to:
        generate a response based at least in part on a particular communication of the second set of communications and the determined attack type;
        transmit the generated response to the attacker;
        determine information associated with the attacker in connection with the transmitted response;
        determine that an attack pattern has changed to a second attack type, the second attack type different from the first attack type; and
        based at least in part on the determined information and the determined second attack type, generate a different response upon receipt of a different communication associated with the determined second attack type.

2. The computer-implemented method of claim 1, wherein the first and second sets of communications comprise electronic mail communications.

3. The computer-implemented method of claim 1, further comprising:
    generating an environment for the attacker that simulates the computer system; and
    causing the imposter service to interact with the attacker via the generated environment.

4. The computer-implemented method of claim 1, further comprising providing the determined information to a requestor associated with the computer system.

5. The computer-implemented method of claim 1, further comprising:
    detecting a previously unrecorded attack type; and
    updating the imposter service with information associated with the detected previously unrecorded attack type.

6. The computer-implemented method of claim 1, wherein:
    the first and second sets of communications are directed to an account associated with the computer system; and
    further comprising:
        intercepting individual communications of at least a subset of the second set of communications; and
        preventing the intercepted individual communications from being accessible via the account.

7. A system, comprising one or more computing devices that implement at least:
    a detector that detects a computer-implemented attack involving at least a first communication and a second communication to a network endpoint by an attacker;
    an analyzer that determines, based at least in part on a pattern associated with the communication, an attack type of the detected attack; and
    an imposter that at least:
        determines, based at least in part on a first determined attack type associated with the first communication, a first set of one or more simulations to provide to the attacker in response to the computer-implemented attack;
        provides a response to the attacker in accordance with the determined first set of one or more simulations;
        determines information associated with the attacker in connection with providing the one or more simulations;
        determines that an attack pattern is of a second attack type, the second attack type different from the first attack type; and
        based at least in part on the information and second attack type, provides a different response in connection with a different communication associated with the detected.

8. The system of claim 7, wherein the system is further configured to:
    implement the detector such that the detector further detects a coordinated computer-implemented attack by a plurality of cooperating attackers; and
    implement the imposter such that the imposter communicates with individual attackers of the plurality of cooperating attackers in accordance with the determined one or more simulations.

9. The system of claim 7, wherein the analyzer determines additional attack types as a result of detection of previously unrecorded attack types detected by the detector.

10. The system of claim 7, wherein the imposter further communicates with the attacker in accordance with the determined one or more simulations by at least providing information about one or more simulated users to the attacker.

11. The system of claim 7, wherein the system implements the imposter to further:
   record the communication;
   detect a security breach of the attacker caused by the communication; and
   provide a record of the communication and the security breach.

12. The system of claim 7, wherein the determined one or more simulations are dependent at least in part on the communication.

13. The system of claim 7, wherein the analyzer further performs an analysis of the detected attack to determine one or more different attack types.

14. A non-transitory computer-readable storage medium having collectively stored thereon executable instructions that, upon execution by one or more processors of a computer system, cause the computer system to at least:
   detect a computer-implemented attack involving a communication to a network endpoint by one or more attackers;
   determine, based at least in part on one or more interactions of the one or more attackers with the system and associated with the communication, one or more attack types of the detected attack;
   implement an imposter in response to detecting the computer-implemented attack; and
   cause the imposter to at least:
      determine, based at least in part on the determined attack type, one or more simulations to provide to the one or more attackers in response to the computer-implemented attack;
      provide a response to the one or more attackers in accordance with the determined one or more simulations associated with the determined attack type;
      determine information associated with the one or more attackers in connection with providing the one or more simulations; and
      based at least in part on the information, provide a different response in connection with a different communication associated with a different determined attack type by the one or more attackers.

15. The non-transitory computer-readable storage medium of claim 14, wherein the instructions further comprise instructions that, upon execution by the one or more processors, cause the computer system to update the plurality of attack types based at least in part on behavior of the one or more attackers.

16. The non-transitory computer-readable storage medium of claim 14, wherein:
   the detected attack targets an computer system account; and
   the instructions that cause the computer system to communicate with the one or more of the one or more attackers in accordance with the determined simulation cause the computer system to impersonate a user of the account.

17. The non-transitory computer-readable storage medium of claim 14, wherein the imposter simulates, to the one or more attackers, the computer system.

18. The non-transitory computer-readable storage medium of claim 14, wherein the instructions further cause the computer system to:
   provide credentials to the one or more of the one or more attackers for accessing an account; and
   record use, by the one or more of the one or more attackers, of the provided credentials for access to the account.

19. The non-transitory computer-readable storage medium of claim 14, wherein the information is identifying information for the one or more attackers.

20. The non-transitory computer-readable storage medium of claim 14, wherein the instructions further cause the computer system to generate an alarm after the computer system detects the computer-implemented attack by the one or more attackers.

21. The non-transitory computer-readable storage medium of claim 14, wherein the instructions further cause the computer system to monitor one or more external processes that generate an alarm in response to detecting the computer implemented attack.

* * * * *